United States Patent
Ohhama et al.

(10) Patent No.: US 9,085,122 B2
(45) Date of Patent: Jul. 21, 2015

(54) DIFFERENT MATERIAL WELDED STRUCTURE

(71) Applicant: HONDA MOTOR CO., LTD, Tokyo (JP)

(72) Inventors: Shosuke Ohhama, Wako (JP); Tetsuya Miyahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/016,306

(22) Filed: Sep. 3, 2013

(65) Prior Publication Data
US 2014/0248508 A1    Sep. 4, 2014

(30) Foreign Application Priority Data
Mar. 4, 2013  (JP) ................... 2013-042417

(51) Int. Cl.
*B32B 15/04*    (2006.01)

(52) U.S. Cl.
CPC ....... *B32B 15/043* (2013.01); *Y10T 428/12653* (2015.01)

(58) Field of Classification Search
None
See application file for complete search history.

(56) References Cited

U.S. PATENT DOCUMENTS

2013/0249250 A1 *   9/2013   Ohhama et al. ............... 296/204

FOREIGN PATENT DOCUMENTS

| JP | 2007-302147 A | 11/2007 | |
| JP | 2009-126472 A | 6/2009 | |
| WO | WO2012077690 A1 * | 6/2012 | ............. B62D 21/00 |

OTHER PUBLICATIONS

Proving Document for Exception to Lack of Novelty filed in corresponding Japanese application No. 2013-042417, w/ English translation.

* cited by examiner

*Primary Examiner* — Adam Krupicka
(74) *Attorney, Agent, or Firm* — Westerman, Hattori, Daniels & Adrian, LLP

(57) ABSTRACT

Extending portions of a front sub-frame are each formed by stacking two thin plates made of steel, and flange portions of the front sub-frame and flange portions of a rear sub-frame made of aluminum are superimposed on each other, and are friction stir welded, with a seal material applied to the superimposed surfaces. Of the two thin plates, the thin plate joined to the rear sub-frame made of aluminum has, at each end thereof, a bent portion and an extending part. The bent portion is formed by bending. The end of the extending part extends outward farther than the rear sub-frame. The extending part is covered by the seal material. The bent portion is disposed at a farther end of the extending part.

5 Claims, 20 Drawing Sheets

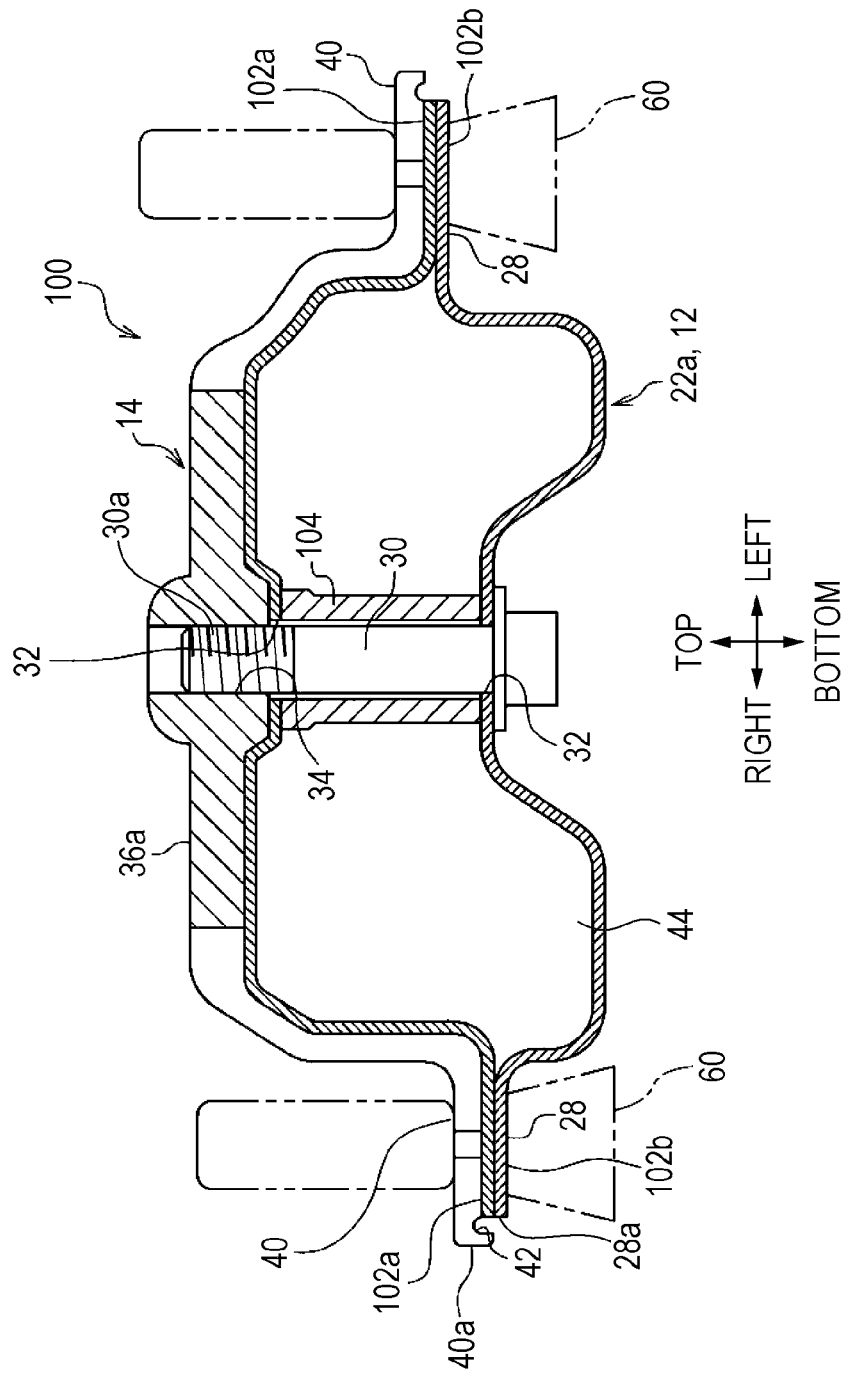

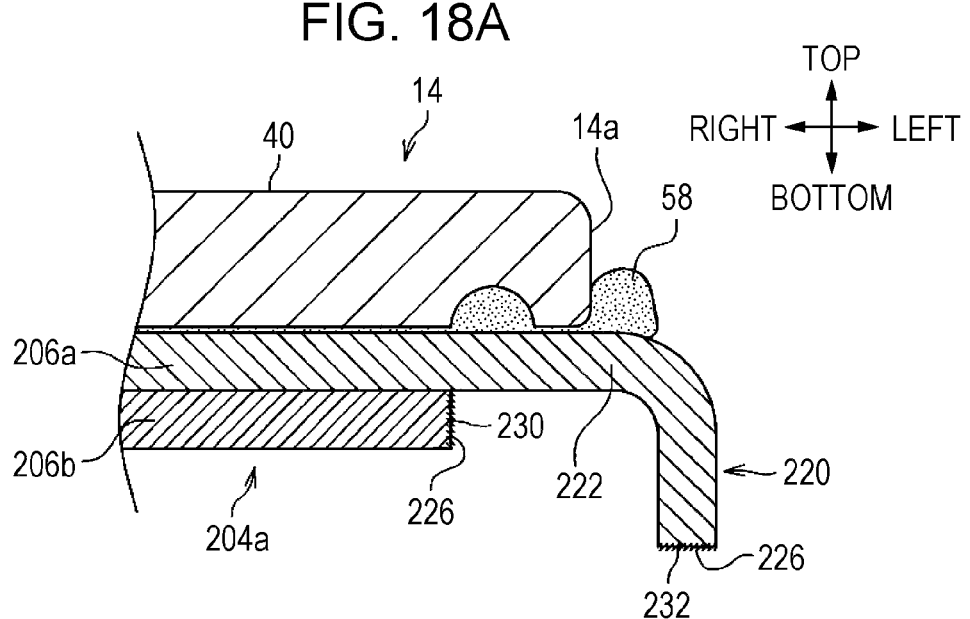
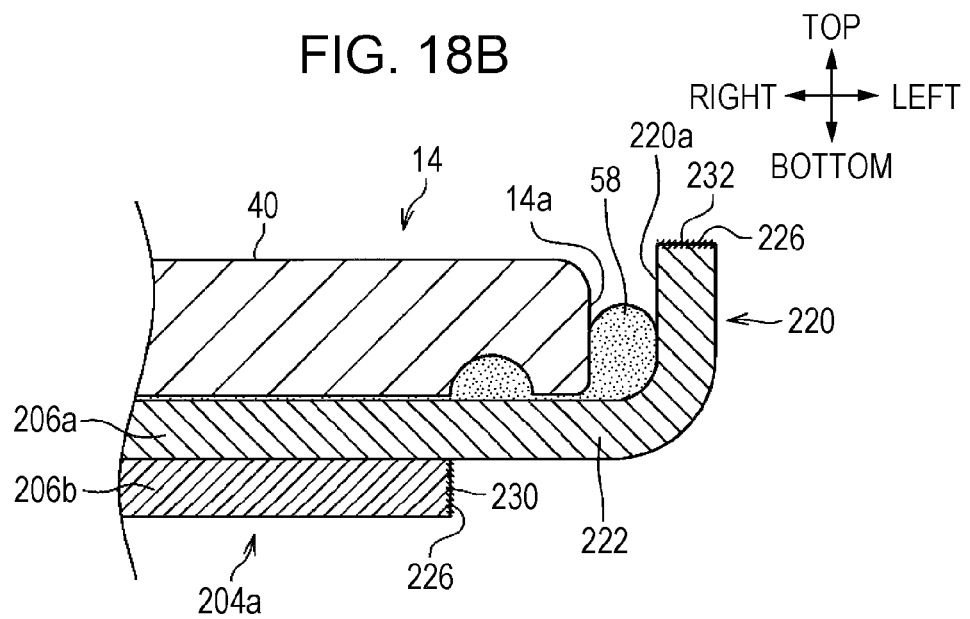

DIFFERENT MATERIAL WELDED STRUCTURE

CROSS REFERENCES TO RELATED APPLICATIONS

The present application claims priority under 35 U.S.C. §119 to Japanese Patent Application No. 2013-042417, filed Mar. 4, 2013, entitled "Different Material Welded Structure." The contents of this application are incorporated herein by reference in their entirety.

TECHNICAL FIELD

The present disclosure relates to a different material welded structure formed by welding different materials together, for example, a sub-frame incorporated in the front portion of a vehicle.

BACKGROUND

Vehicles such as automobiles employ a sub-frame structure that is fixed to front side frames as vehicle body members and to which suspension components, such as suspension arms and a stabilizer, are attached and that supports the suspension components.

As this type of sub-frame structure, for example, Japanese Unexamined Patent Application Publication No. 2007-302147 discloses a sub-frame structure including a rear member that is made of light metal and to which suspension components are attached, two side members that are made of steel and are joined to the front ends of two side portions of the rear member and extend toward the front of the vehicle, and a cross member that connects the two side members in the vehicle width direction.

Japanese Unexamined Patent Application Publication No. 2009-126472 discloses, in relation to a welded structure of an automotive structure such as a center pillar, friction stir welding a flange on the opening-side edge of a box structure member made of aluminum alloy and a flat plate-like cover made of galvanized steel plate.

SUMMARY

The inventors found the followings. It is conceivable that the members made of different metals such as disclosed in Japanese Unexamined Patent Application Publication No. 2007-302147 are integrally joined using the welding method such as disclosed in Japanese Unexamined Patent Application Publication No. 2009-126472. That is, flanges are provided on the end faces of the side portions of the rear member made of light metal, and two-ply flanges are provided on the end faces of the side members made of steel. It is conceivable that, while applying a seal material to the superimposed surfaces of the rear member and the side members, the flanges of the rear member and the two-ply flanges of the side members are friction stir welded to each other so as to form a different material welded structure.

However, in the different material welded structure formed by applying the welding method such as disclosed in Japanese Unexamined Patent Application Publication No. 2009-126472 to the structure such as disclosed in Japanese Unexamined Patent Application Publication No. 2007-302147, the seal material may peel owing, for example, to the galvanic corrosion (electrolytic corrosion) between members made of different metals or the formation of rust or the like. If the seal material peels, the durability of the different material welded structure may deteriorate.

The present disclosure is made in view of the above points, and provides a different material welded structure in which the seal material can be prevented from peeling when different metals are friction stir welded to each other.

In an aspect of the present disclosure, a different material welded structure is formed by integrally welding a thin plate-like member made of iron and a thin plate-like member made of light metal. The member made of iron is formed by stacking two or more thin plates made of steel. The thin plates are electrodeposition-coated before welding to the member made of light metal, and electrodeposition coatings are thereby formed on the surface welded to the member made of light metal, the stacked surfaces of the thin plates, and the underside of the thin plates on the side opposite to the surface welded to the member made of light metal. With the member made of iron and the member made of light metal superimposed on each other and a seal material applied to the superimposed surfaces, a rotating tool for friction stir welding is inserted while rotating in a direction perpendicular to the superimposed surfaces and from the member made of light metal side toward the member made of iron side, and the rotating tool for friction stir welding is inserted while rotating into the member made of iron and performs friction stir welding. Of the two or more thin plates made of steel, the thin plate welded to the member made of light metal has a bent portion formed by bending at each end thereof.

In this aspect, a thin plate-like member made of iron and a thin plate-like member made of light metal are friction stir welded with a seal material applied therebetween, and the edge portions (end portions) of the member made of iron welded to the member made of light metal are bent to form bent portions. Therefore, even if the edge portions of the member made of iron without an electrodeposition coating are corroded, the seal material extruded from a portion between the member made of iron and the member made of light metal can be prevented from peeling off and deteriorating the seal performance.

It is preferable that at each end of the thin plate welded to the member made of light metal, an extending part be provided, the end of the extending part closest to the bent portion extend outward farther than the member made of light metal, and the extending part be covered by the seal material.

In this aspect, the seal material may be held by the extending part, and a corrosion factor can be adequately prevented from entering between the member made of iron and the member made of light metal by the seal material.

It is preferable that the bent portion be bent in the direction opposite to the member made of light metal. If rust is formed on the edge portion of the bent portion, the formed rust can be adequately prevented from having a bad influence on the seal material protruding from a portion between the member made of iron and the member made of light metal since the bent portion is bent in the direction opposite to the member made of light metal.

According to one aspect, a different material welded structure in which the seal material can be prevented from peeling when different metals are friction stir welded to each other can be obtained.

BRIEF DESCRIPTION OF THE DRAWINGS

The advantages of the disclosure will become apparent in the following description taken in conjunction with the following drawings.

FIG. 11 is a vertical sectional view taken along line XI-XI of FIG. 10A.

FIG. 18A is a partial enlarged view of FIG. 16. FIG. 18B is a partial enlarged vertical sectional view showing a modification of a bent portion bent in a different direction.

DETAILED DESCRIPTION

Figure 1:
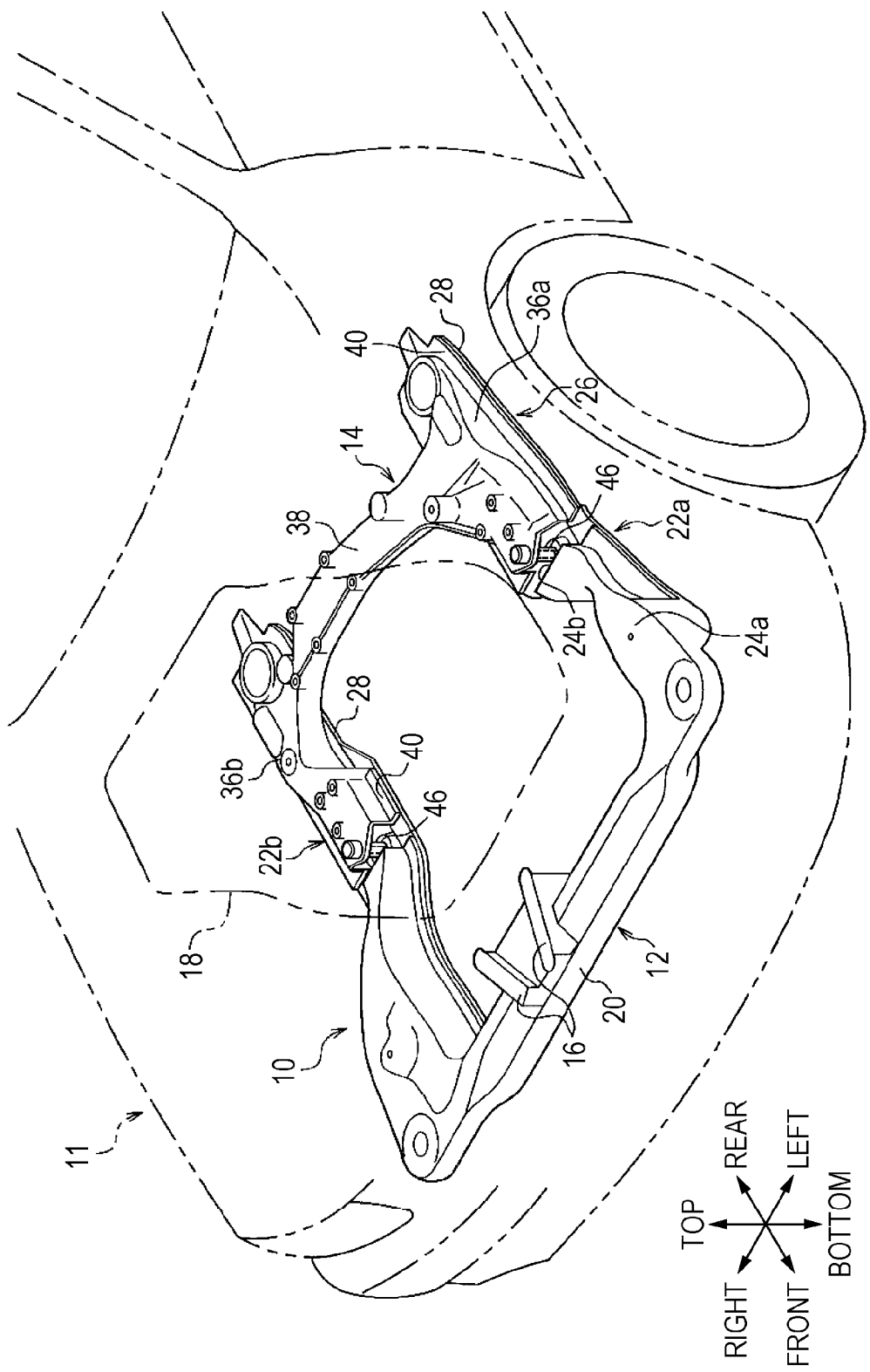
FIG. 1 is a schematic perspective view showing a state where a sub-frame structure according to a first referential embodiment of the present disclosure is incorporated in the front portion of an automobile.
Figure 2:
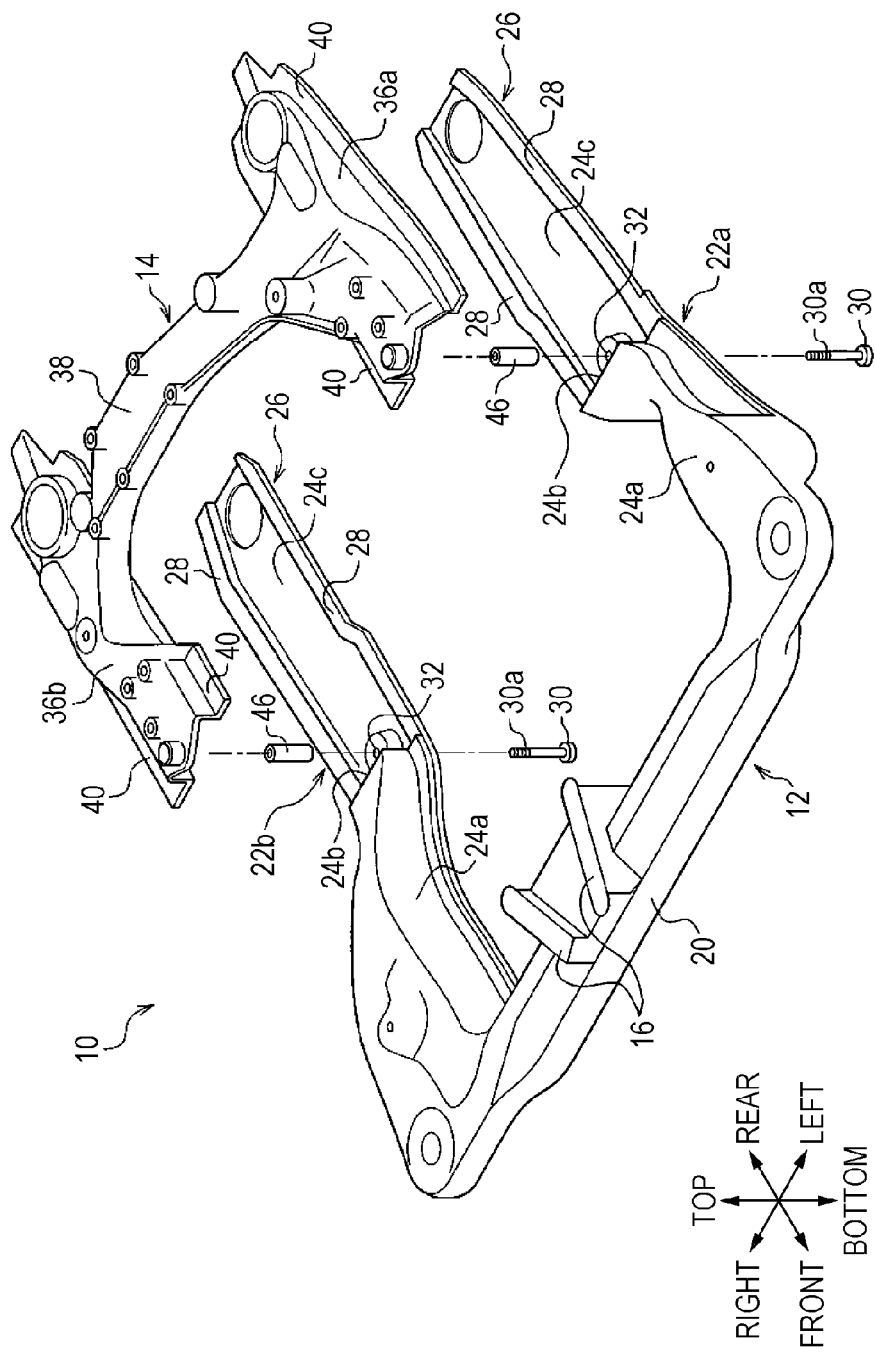
FIG. 2 is an exploded perspective view of the sub-frame structure according to the first referential embodiment.
Figure 3A:
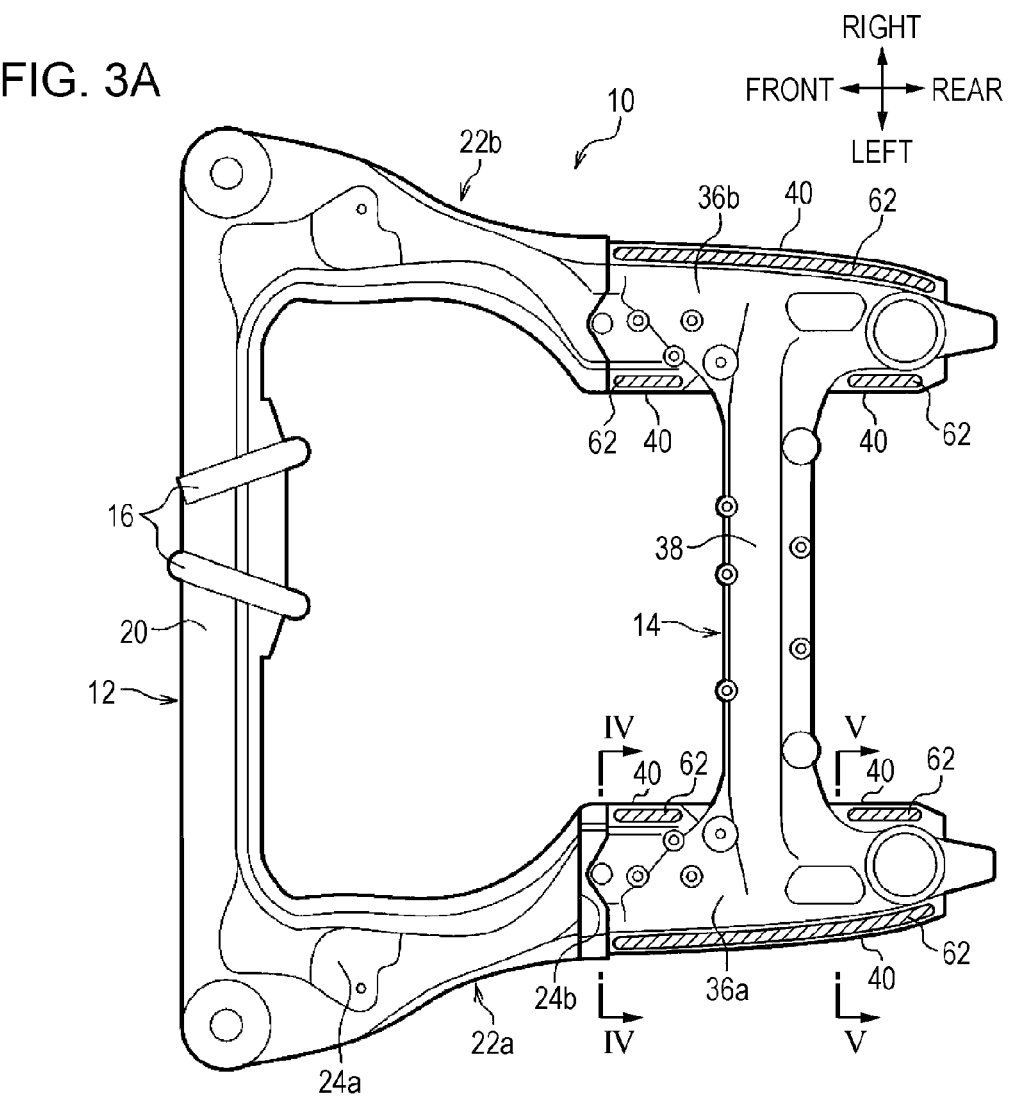
FIG. 3A is a plan view of the sub-frame structure according to the first referential embodiment.
Figure 3B:
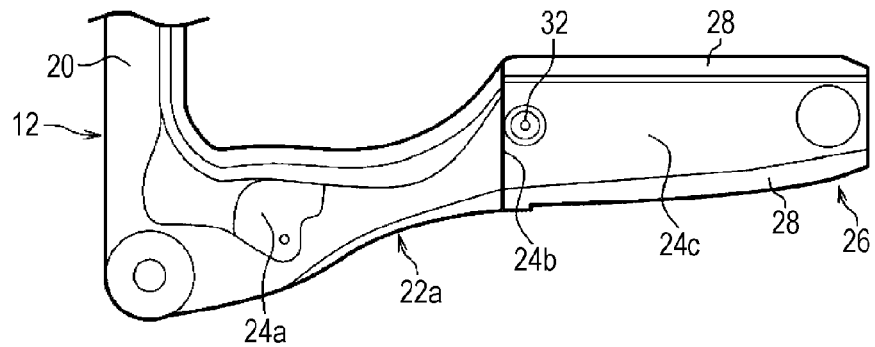
FIG. 3B is a partial plan view of the sub-frame structure with a rear sub-frame removed, that is, a front sub-frame.
Figure 4:
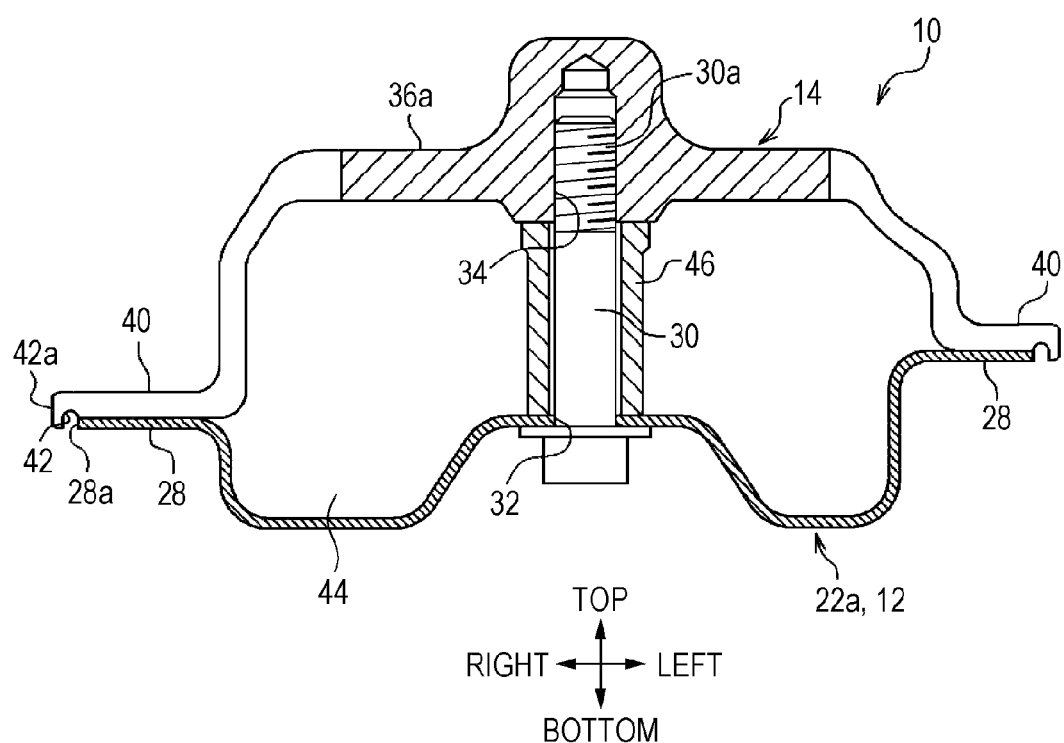
FIG. 4 is a vertical sectional view taken along line IV-IV of FIG. 3A.
Figure 5:
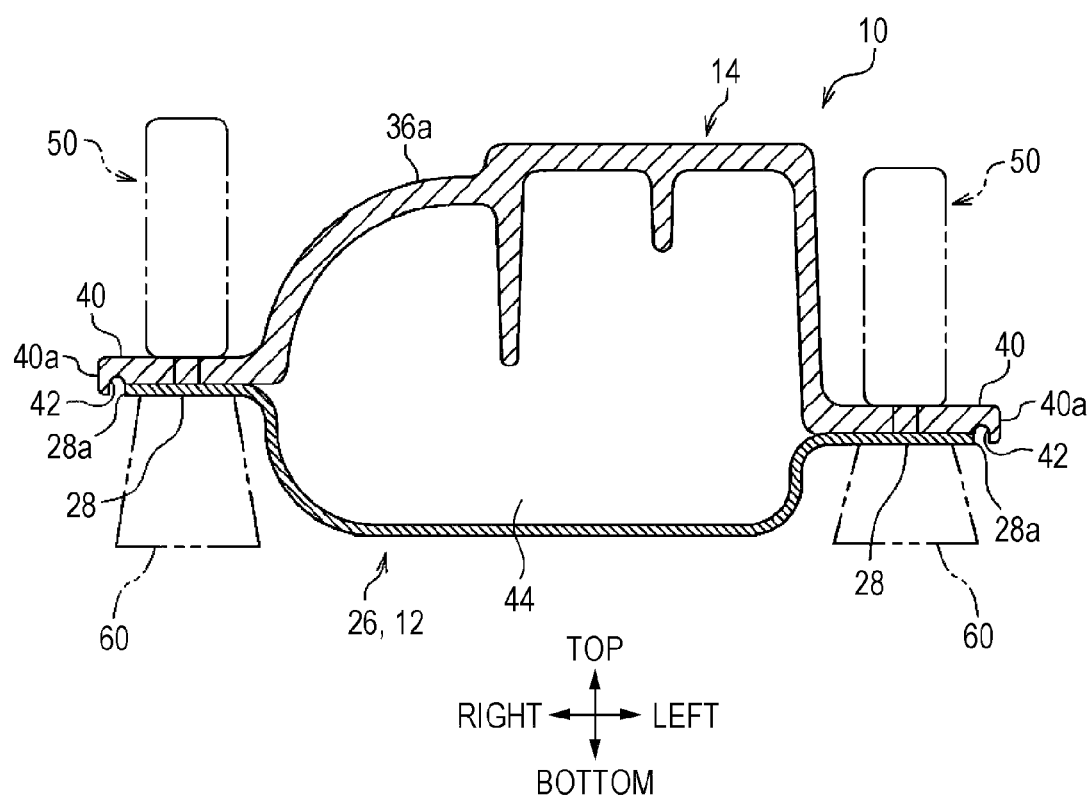
FIG. 5 is a vertical sectional view taken along line V-V of FIG. 3A.

Next, embodiments of the present disclosure will be described in detail with reference to the drawings. FIG. 1 is a schematic perspective view showing a state where a sub-frame structure according to a first referential embodiment of the present disclosure is incorporated in the front portion of an automobile. FIG. 2 is an exploded perspective view of the sub-frame structure according to the first referential embodiment. FIG. 3A is a plan view of the sub-frame structure according to the first referential embodiment. FIG. 3B is a partial plan view of the sub-frame structure with a rear sub-frame removed, that is, a front sub-frame. FIG. 4 is a vertical sectional view taken along line IV-IV of FIG. 3A. FIG. 5 is a vertical sectional view taken along line V-V of FIG. 3A.

As shown in FIG. 1, the sub-frame structure (different material welded structure) 10 according to the first referential embodiment of the present disclosure is disposed in the front portion of the vehicle body and is provided so as to be fixed to a not-shown vehicle body member (framework member), or is provided so as to be floatably supported by a not-shown floating mechanism. When the sub-frame structure 10 is supported by the not-shown floating mechanism, vibration transmitted from the vehicle body can be adequately absorbed.

As shown in FIG. 1 to FIG. 3B, the sub-frame structure 10 is divided into two parts with respect to the front-rear direction of the vehicle, and includes a front sub-frame (member made of iron) 12 that has a substantially U-shape in plan view and that is made of steel, and a rear sub-frame (member made of light metal) 14 that has a substantially H-shape in plan view and that is made of light metal. The front sub-frame 12 is, for example, a press molded body formed by press molding a not-shown steel plate. The rear sub-frame 14 is, for example, a die-cast molded body formed by die-cast molding in which molten aluminum alloy (aluminum) is solidified in a cavity of not-shown dies (die-cast machine).

In each figure, "FRONT" and "REAR" respectively show the front and the rear of the vehicle 11 (see FIG. 1) in the front-rear direction of the vehicle, and "LEFT" and "RIGHT" respectively show the left and the right of the vehicle 11 in the vehicle width direction.

As shown in FIG. 2, the front sub-frame 12 has a front cross member 20 that supports the front portion of an engine 18 (see FIG. 1) with a not-shown front engine mount attached to a mount portion (base) 16 in between and that extends along the vehicle width direction, and a pair of left and right side members 22a and 22b that are joined to both axial ends of the front cross member 20 and that extend from the front cross member 20 toward the rear of the vehicle substantially parallel to each other.

The front cross member 20 and the pair of left and right side members 22a and 22b may be integrally molded, for example, by casting or forging, or the front ends of the pair of left and right side members 22a and 22b may be joined to both axial ends of the front cross member 20 by welding.

The front cross member 20 is a hollow member made of steel. Front portions 24a in front of central portions (intermediate portions) 24b along the axial direction of the pair of left and right side members 22a and 22b are hollow portions made of steel. The central portions 24b along the axial direction and rear portions 24c in the rear of the central portions 24b of the pair of left and right side members 22a and 22b form thin plate portions 26 thinner than the front portions 24a.

In this case, the thin plate portions 26 of the pair of left and right side members 22a and 22b are extending portions that extend toward the rear by a predetermined length compared to conventional left and right side members. As shown in FIG. 4, the central portions 24b and thin plate portions 26 of the pair of left and right side members 22a and 22b are formed of a thin plate in a substantially hat shape in vertical section, and flange portions 28 extending along the axial direction of the side members are formed on both the left and right sides of the respective left and right side members 22a and 22b (however, the depiction of the right side member 22b is omitted in FIG. 4).

Bolt insertion holes 32 into which bolts 30 are inserted are formed in the central portions 24b with respect to the axial direction of the pair of left and right side members 22a and 22b. In this case, as shown in FIG. 4, a pair of bolts 30 can be passed through the bolt insertion holes 32 of the left and right side members 22a and 22b from below, and the threaded portions 30a of the bolts 30 can be screwed into bottomed threaded holes 34 provided at the front end of the rear sub-frame 14. As a result, the front sub-frame 12 and the rear sub-frame 14 are fixed to each other at positions on both the left and right sides of the respective side members with respect to the vehicle width direction, with the pair of bolts 30.

The rear sub-frame 14 is a rear member that supports the rear portion of the engine 18 with a not-shown rear engine mount in between and that extends along the vehicle width direction. The rear member includes a pair of left and right rear side portions 36a and 36b that are placed over the upper surfaces of the central portions 24b and the thin plate portions 26 in the rear of the central portions 24b of the left and right side members 22a and 22b and that cover (are superimposed on) parts of the upper surfaces of the left and right side members 22a and 22b, and a rear cross portion 38 that connects the pair of left and right rear side portions 36a and 36b. The rear member is formed of a light metal such as aluminum, magnesium, or an alloy thereof.

Figure 7A:
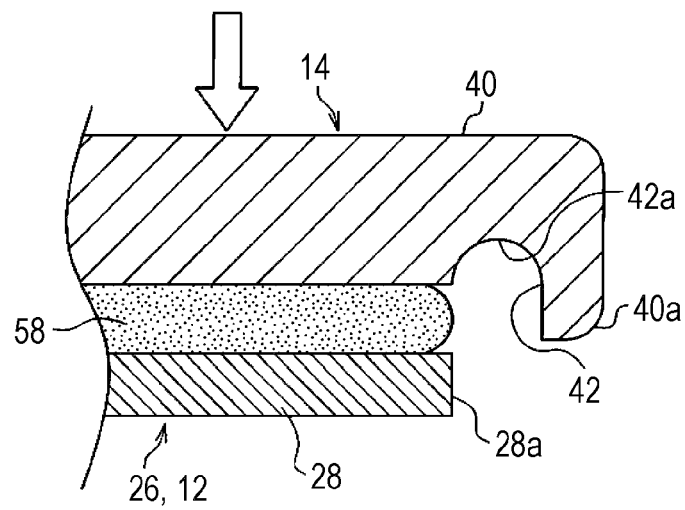
FIGS. 7A to 7C are explanatory views showing a state where a seal material accumulates in a recessed portion.
Figure 7B:
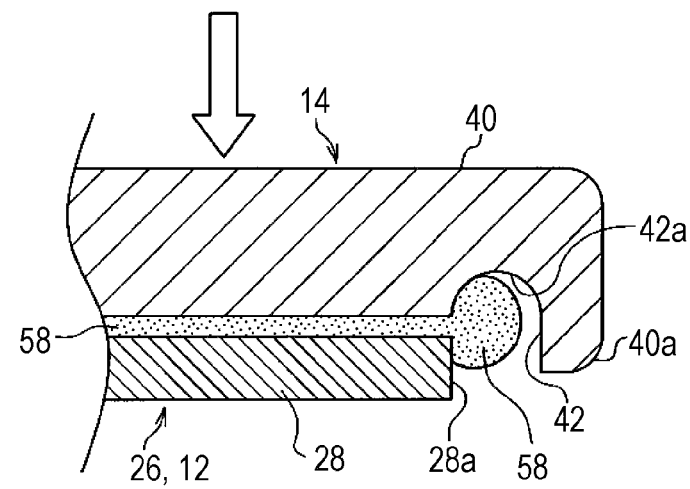
Figure 7C:
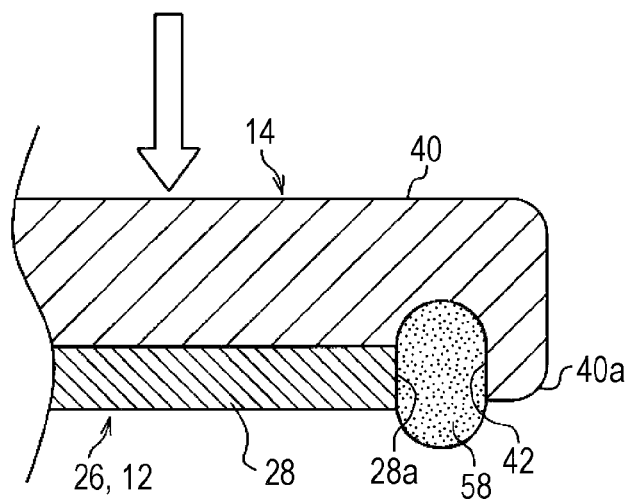

Flange portions 40 are provided on both sides of the respective left and right rear side portions 36a and 36b. The flange portions 40 are formed so as to extend from one end to the other end along the axial direction of the left and right rear side portions 36a and 36b. In this case, the side edge portions 40a of the flange portions 40 of the left and right rear side portions 36a and 36b are formed so as to slightly protrude toward both the left and right along the vehicle width direction compared with the flange portions 28 of the left and right side members 22a and 22b (see FIG. 5). As shown in FIGS. 7A to 7C, the protruding side edge portions 40a of the flange portions 40 of the left and right rear side portions 36a and 36b bend downward, and recessed portions 42 having upwardly recessed ceiling surfaces 42a (see FIGS. 7A to 7C) are provided between the side edge portions 40a and the side edge portions 28a of the flange portions 28 of the front sub-frame 12. The recessed portions 42 extend along the axial direction of the left and right rear side portions 36a and 36b.

In other words, by slightly protruding the side edge portions 40a of the flange portions 40 of the left and right rear side portions 36a and 36b (the rear sub-frame 14) toward both the left and right along the vehicle width direction compared with the flange portions 28 of the left and right side members 22a and 22b (the front sub-frame 12) and bending these protruded portions vertically downward, recessed portions 42 having ceiling surfaces 42a are formed between the side edge portions 40a and the side edge portions 28a of the flange portions 28 of the left and right side members 22a and 22b.

It is preferable that the lower surfaces of the vertically downwardly bent side edge portions 40a of the flange portions 40 of the left and right rear side portions 36a and 36b be coplanar or substantially coplanar, along the horizontal direction, with the lower surfaces of the flange portions 28 of the left and right side members 22a and 22b (see FIG. 7C).

In this case, the flange portions 28 provided on both the left and right sides of the left and right side members 22a and 22b are located under the flange portions 40 provided on both the left and right sides of the left and right rear side portions 36a and 36b, the flange portions 28 and the flange portions 40 are integrally welded together, in a superimposed state, by friction stir welding, and closed cross sections 44 are thereby formed (see FIG. 4 and FIG. 5).

The bolts 30 passed through the bolt insertion holes 32 provided in the central portions 24b are screwed into the threaded holes 34 provided in the left and right rear side portions 36a and 36b and passed through the closed cross sections 44, and the left and right side members 22a and 22b and the left and right rear side portions 36a and 36b of the rear member are thereby fastened together.

Within the closed cross sections 44, collar members 46 are provided that are tubular bodies surrounding the outer peripheries of the bolts 30 and that reinforce the joint strength of the left and right side members 22a and 22b and the left and right rear side portions 36a and 36b when the bolts 30 are tightened. The bolted regions are located in non-weld regions where the front sub-frame 12 and the rear sub-frame 14 are not welded together by friction stir welding to be described later, and the non-weld regions which cannot be welded can be strengthened by bolting. As a result, when the front sub-frame 12 made of steel and the rear sub-frame 14 made of light metal are friction stir welded to each other, desired stiffness and strength can be secured by cooperation with the bolted regions which are non-weld regions.

Therefore, the front sub-frame 12 and the rear sub-frame 14 are firmly fixed (joined) to each other by friction stir welding the flange portions 28 and 40 in the superimposed regions, and the stiffness and strength can be further increased throughout the sub-frame structure 10 by fastening the front sub-frame 12 and the rear sub-frame 14 together by the bolts 30 in the non-weld regions where friction stir welding is not performed. The stiffness and strength can be further increased by forming threaded holes (not shown) in the rear of the regions fastened with the bolts 30 in the left and right rear side portions 36a and 36b, inserting not-shown reinforcing bolts into insertion holes in the rear portions 24c of the left and right side members 22a and 22b from below, and screwing the reinforcing bolts into the threaded holes.

Figure 6A:
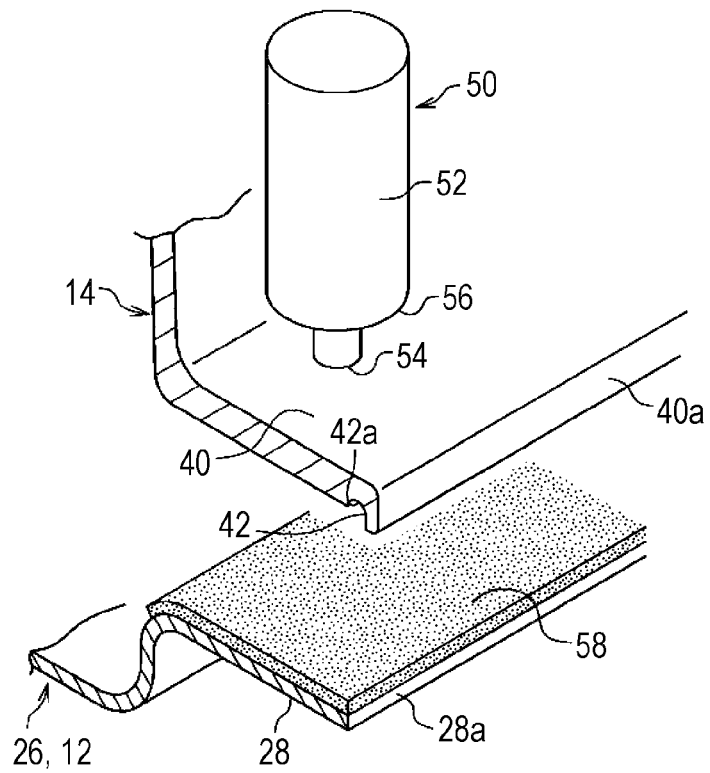
FIG. 6A is a perspective view showing a state where friction stir welding is performed using a welding tool.
Figure 6B:
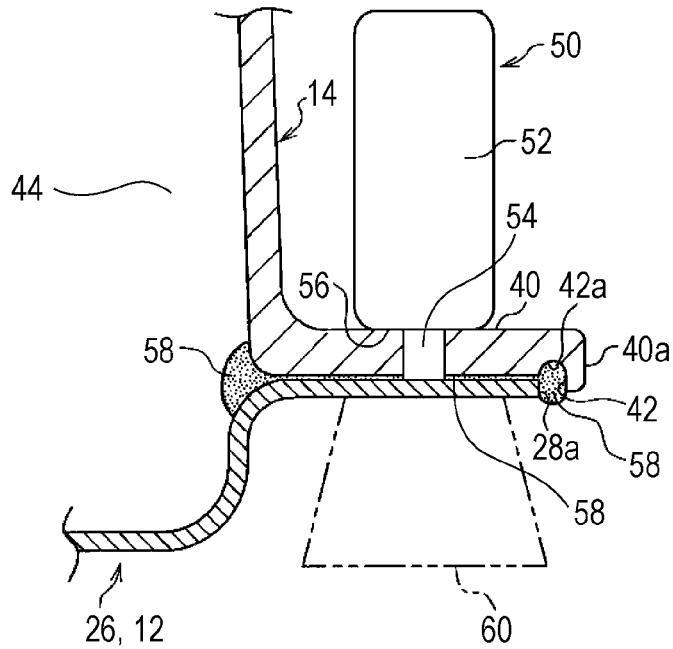
FIG. 6B is a vertical sectional view showing a state of friction stir welding.

The sub-frame structure 10 according to the first referential embodiment is basically configured as described. Next, the operation and effect thereof will be described. FIG. 6A is a perspective view showing a state where friction stir welding is performed using a welding tool. FIG. 6B is a vertical sectional view showing a state of friction stir welding.

First, the process of integrally joining by friction stir welding the superimposed regions of the flange portions 28 of the front sub-frame 12 formed of steel and the flange portions 40 of the rear sub-frame 14 formed of aluminum alloy will be described.

As shown in FIGS. 6A and 6B, the welding tool 50 used for friction stir welding has a cylindrical stir rod 52 rotationally driven about a rotation axis by a not-shown rotary drive source such as a motor, and a probe 54 protruding from the center of the bottom of the stir rod 52 along the axial direction. The diameter of the probe 54 is set smaller than the diameter of the stir rod 52, and a shoulder portion 56 is formed in the annular stepped portion between the probe 54 and the stir rod 52.

Next, the process of welding the front sub-frame 12 and the rear sub-frame 14 will be described. The front sub-frame 12 is a press molded body preliminarily formed by press molding a steel plate, and the rear sub-frame 14 is a die-cast molded body preliminarily formed by die-cast molding aluminum alloy.

First, the front sub-frame 12 is set on a not-shown clamp table, and then a seal material (seal member) 58 (for example, an air-dry seal material) is applied to the upper surface of the front sub-frame 12 with a not-shown seal material application mechanism. The rear sub-frame 14 is placed over the upper surface of the front sub-frame 12 (the thin plate portions 26 in the rear of the central portions 24b) to which the seal material 58 is applied, and then the front sub-frame 12 and the rear sub-frame 14 which vertically superimposed are clamped using a not-shown clamp mechanism.

Next, using the above-described welding tool 50, the flange portions 28 of the front sub-frame 12 and the flange portions 40 of the rear sub-frame 14 are friction stir welded. Jigs 60 for backing up the welding pressure applied to the flange portions 28 and 40 by the welding tool 50 are provided under the flange portions 28 and 40 of the front sub-frame 12 and the rear sub-frame 14.

Next, the friction stir welding process is performed as follows. While being integrally rotated using a not-shown rotary drive source, the stir rod 52 and the probe 54 are gradually moved closer to the upper surface of the rear sub-frame 14 formed of light metal such as aluminum alloy. The welding pressure (downward pressure) causes the tip of the probe 54 to come into contact with and enter the upper surface of the rear sub-frame 14 while rotating, and a plastic flow region is thereby generated in the rear sub-frame 14.

The stir rod 52 and the probe 54 are caused to be pressed further into the rear sub-frame 14 while rotating integrally, and the probe 54 is inserted vertically downward until the shoulder portion 56 of the stir rod 52 comes into sliding contact with the upper surface of the rear sub-frame 14. At that time, welding pressure is applied until the tip of the probe 54 comes into contact with the upper surface of the front sub-frame 12 formed of steel.

The probe 54 is caused to enter the rear sub-frame 14 while rotating until the probe 54 comes into contact with the upper surface of the front sub-frame 12. Thereby, the plastic flow region generated in the rear sub-frame 14 formed of light metal is caused to plastic flow, and a fresh steel surface of the front sub-frame 12 formed of steel is exposed and solid-state welded to the rear sub-frame 14.

By moving the stir rod 52 and the probe 54 along the axial direction of the flange portions 28 and 40 superimposed on each other, with the stir rod 52 and the probe 54 rotating and the tip of the probe 54 in contact with the upper surface of the front sub-frame 12, friction stir weld regions (weld portions) 62 (see the hatched parts in FIG. 3A) are formed. In the friction stir weld regions 62, an intermetallic compound is formed at the weld interface between the rear sub-frame 14 (formed of light metal such as aluminum alloy) on the upper side and the front sub-frame 12 (formed of steel) on the lower side. This intermetallic compound is formed not in the form of a continuous layer extending throughout the weld interface but in the form of grains or separate layers scattered in the weld interface.

FIGS. 7A to 7C are explanatory views showing a state where a seal material accumulates in a recessed portion. A seal accumulation structure in which a seal material 58 interposed between the front sub-frame 12 and the rear sub-frame 14 protrudes from both the left and right sides (both side portions) and accumulates in the recessed portions 42 will be described below with reference to FIGS. 7A to 7C.

After the rear sub-frame 14 is superimposed on the front sub-frame 12 to the upper surface of which is applied the seal material 58 (see FIG. 7A), the front sub-frame 12 and the rear sub-frame 14 are clamped with a not-shown clamping mechanism. Thereby, the seal material 58 is slightly protruded from both the left and right sides of the front sub-frame 12 and the rear sub-frame 14 (see FIG. 7B).

The seal material 58 protruded from both the left and right sides of the front sub-frame 12 and the rear sub-frame 14 superimposed on each other accumulates in the recessed portions 42 having the ceiling surfaces 42a without being scattered. Then, the front sub-frame 12 and the rear sub-frame 14 are friction stir welded in a clamped state. Thereby, the seal material 58 is further protruded from both the left and right sides, and a necessary and sufficient amount of seal material 58 is held in the recessed portions 42 (see FIG. 7C).

The seal material 58 held in the recessed portions 42 is, for example, an air-dry seal material, and is solidified after the lapse of a predetermined time, and the gaps on both the left and right sides of the front sub-frame 12 and the rear sub-frame 14 are reliably sealed.

As a result, in the first referential embodiment, the seal material 58 protruded from both the left and right sides of the friction stir welded front sub-frame 12 and rear sub-frame 14 can be prevented from being scattered, water can be prevented from entering through the gaps on both the left and right sides of the front sub-frame 12 and the rear sub-frame 14, and high rust prevention performance can be secured.

The worker can confirm the amount of the seal material 58 accumulated in the recessed portions 42, by visual inspection from the outside. Therefore, the worker can confirm the amount of the applied seal material 58 and determine whether or not the seal material 58 is reliably interposed between the front sub-frame 12 and the rear sub-frame 14.

The flange portions 28 and 40 are friction stir welded to each other, and closed cross sections 44 are formed between the front sub-frame 12 and the rear sub-frame 14. Also on the inner side of the flange portions 28 and 40 (the closed cross sections 44 are formed on this side), the seal material 58 protrudes and is solidified, and the sealing function is fulfilled (see FIG. 6B). Therefore, a water accumulation prevention structure in which, for example, if water droplets (water) run down the inner wall surface of the rear sub-frame 14, the water droplets do not accumulate in the gap between the flange portions 28 and 40, can be achieved.

There is fear that when different materials of the front sub-frame 12 formed of steel and the rear sub-frame 14 formed of aluminum are friction stir welded to each other, a potential difference occurs and a corrosion current flows between the metals owing to the difference in ionization tendency between the metals, and galvanic corrosion (electrolytic corrosion) due to contact between different metals is thereby caused. However, in the first referential embodiment, the seal material 58 protruded from the friction stir welded flange portions 28 and 40 is solidified, and the flow of corrosion current can thereby be prevented. As a result, in the first referential embodiment, the resistance to corrosion due to contact between different metals can be improved.

Next, a sub-frame structure 100 according to a second referential embodiment of the present disclosure will be described below. In the embodiments described below, the same reference numerals will be used to designate the same components as those of the sub-frame structure 10 according to the first referential embodiment shown in FIG. 1, and the detailed description thereof will be omitted.

Figure 8:
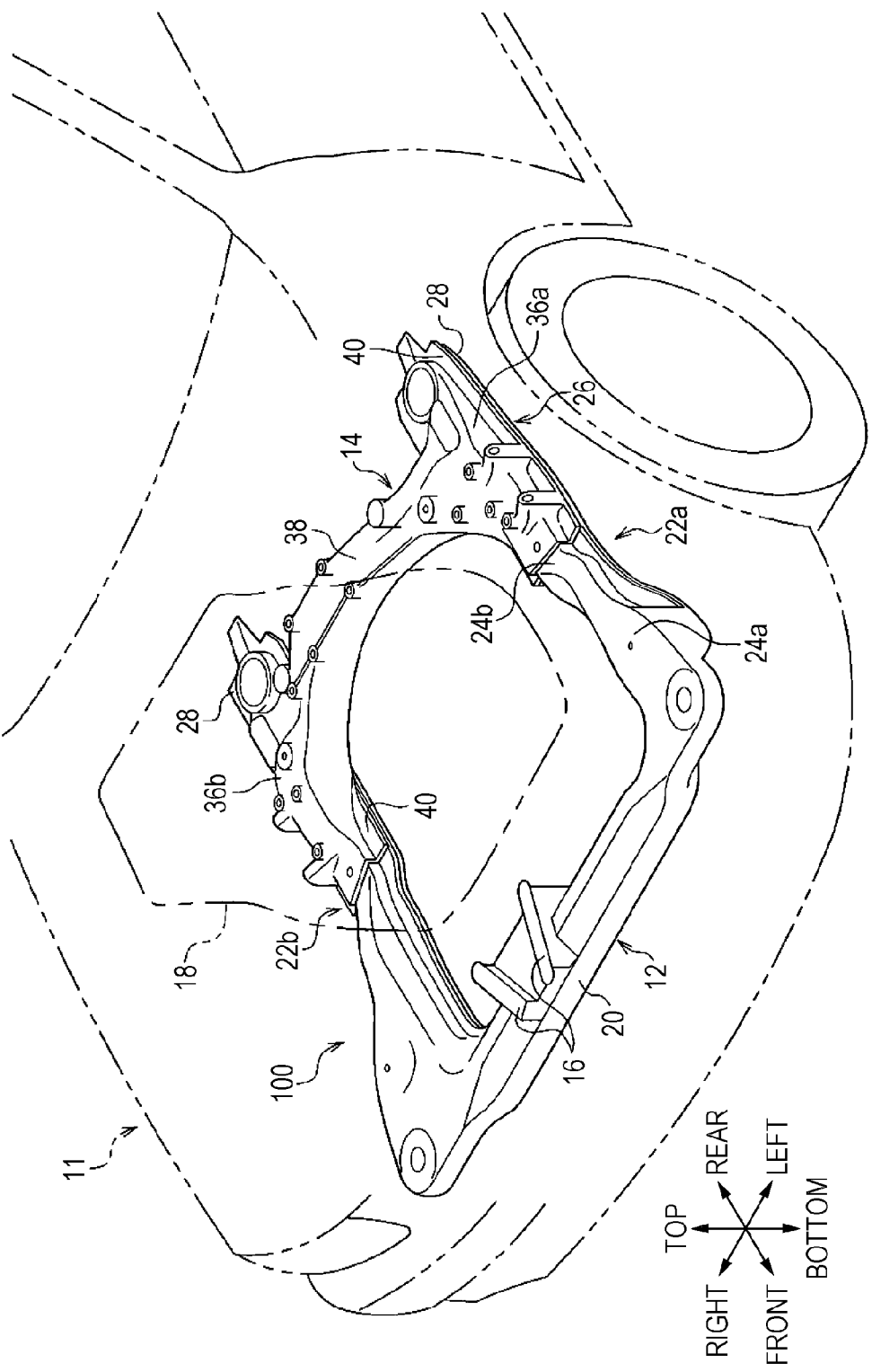
FIG. 8 is a schematic perspective view showing a state where a sub-frame structure according to a second referential embodiment of the present disclosure is incorporated in the front portion of an automobile.
Figure 9:
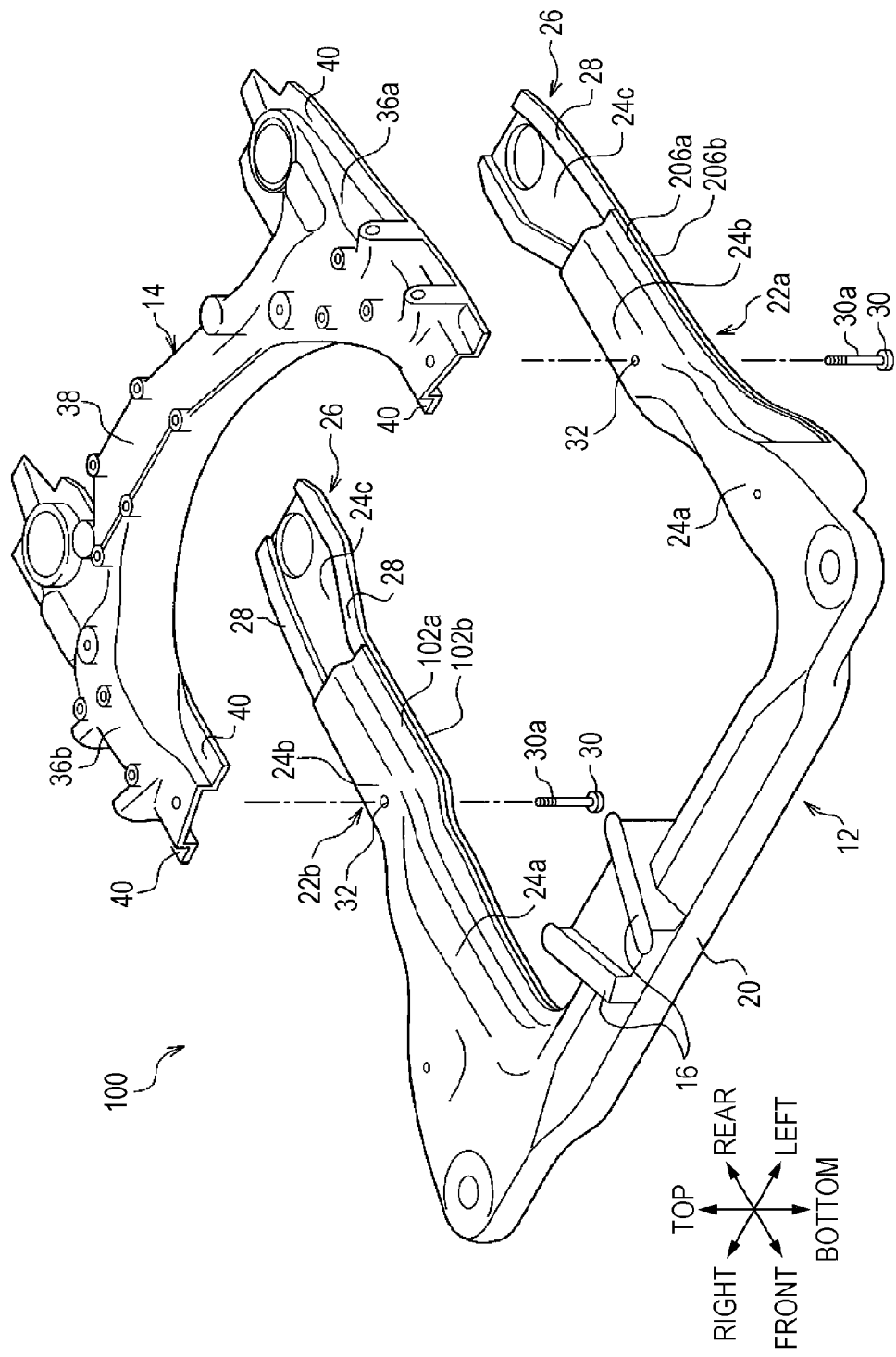
FIG. 9 is an exploded perspective view of the sub-frame structure according to the second referential embodiment.
Figure 10A:
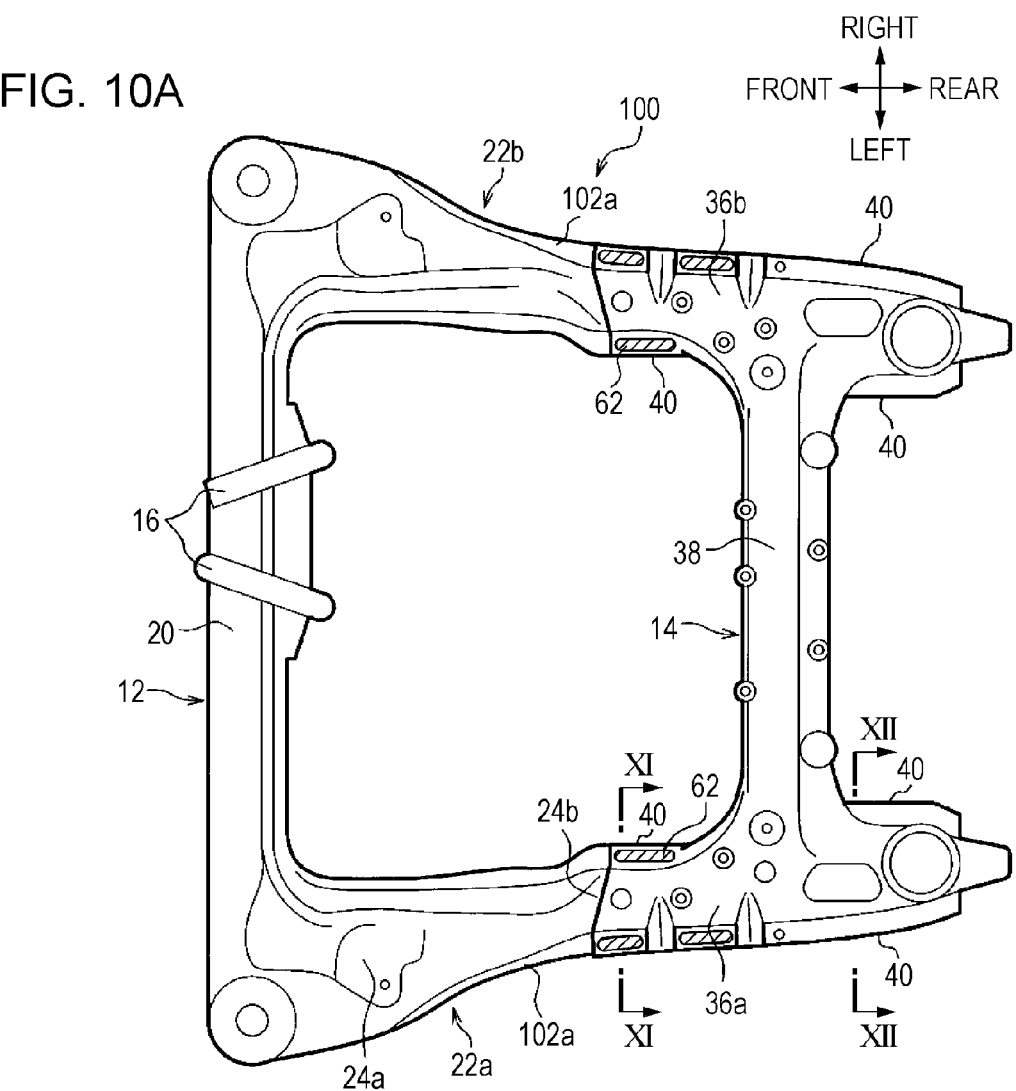
FIG. 10A is a plan view of the sub-frame structure according to the second referential embodiment.
Figure 10B:
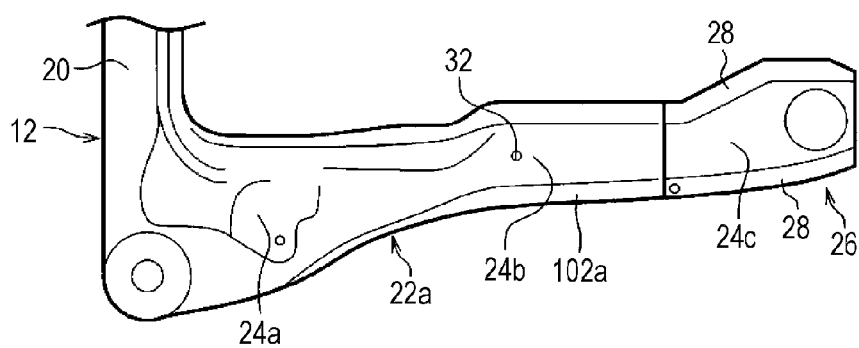
FIG. 10B is a partial plan view of the sub-frame structure with a rear sub-frame removed, that is, a front sub-frame.

FIG. 8 is a schematic perspective view showing a state where a sub-frame structure according to a second referential embodiment of the present disclosure is incorporated in the front portion of an automobile. FIG. 9 is an exploded perspective view of the sub-frame structure according to the second referential embodiment. FIG. 10A is a plan view of the sub-frame structure according to the second referential embodiment. FIG. 10B is a partial plan view of the sub-frame structure with a rear sub-frame removed, that is, a front sub-frame.

Figure 12:
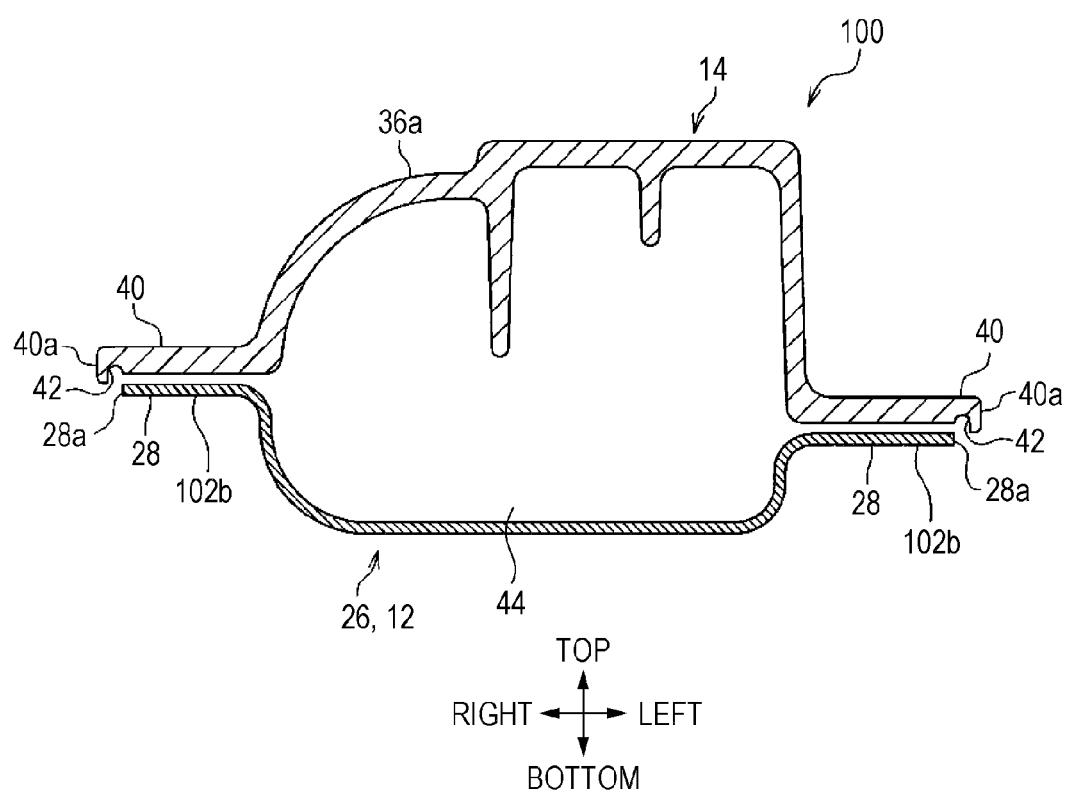
FIG. 12 is a vertical sectional view taken along line XII-XII of FIG. 10A.

FIG. 11 is a vertical sectional view taken along line XI-XI of FIG. 10A. FIG. 12 is a vertical sectional view taken along line XII-XII of FIG. 10A.

In the sub-frame structure 100 according to the second referential embodiment, as shown in FIG. 11, the bolted regions in the central portions 24b of the left and right side members 22a and 22b of the front sub-frame 12 each have a closed cross section 44 formed by joining two thin plates 102a and 102b made of steel. Therefore, the sub-frame structure 100 according to the second referential embodiment differs from the sub-frame structure 10 according to the first referential embodiment in which the bolted regions of the left and right side members 22a and 22b are each formed of a steel plate, and closed cross sections 44 (see FIG. 4) are formed between the front sub-frame 12 and the rear sub-frame 14.

In this embodiment, bolt insertion holes 32 into which a bolt 30 is inserted are formed in the two thin plates 102a and 102b forming each of the left and right side members 22a and 22b, the threaded portion 30a of the bolt 30 passed through the bolt insertion holes 32 is screwed into a threaded hole 34 of the rear sub-frame 14, and the bolt 30 is thereby disposed to pass through the closed cross section 44 formed by the two thin plates 102a and 102b.

Within the closed cross section 44, a collar member 104 is provided that is a tubular body surrounding the outer periphery of the bolt 30. One axial end of the collar member 46 is connected to the thin plate 102a, and the other end is connected to the thin plate 102b. The collar member 104 is provided in order to prevent the deformation of the thin plates 102a and 102b when the bolt 30 is tightened and to reinforce the joint strength of the bolted region. Here, the collar member 104 may be integrally formed with the lower thin plate 102b, or the collar member 104 may be preliminarily welded and fixed to the upper surface of the thin plate 102b. When the bolt 30 passed through the closed cross section 44 formed by the two thin plates 102a and 102b is tightened, the region around the bolt where the rear sub-frame 14 formed of aluminum alloy and the upper thin plate 102a formed of steel are stacked may be preferably welded (see FIG. 11).

In the second referential embodiment, the left and right side members 22a and 22b are each formed by joining two thin plates 102a and 102b made of steel, and a closed cross section 44 is formed therebetween. Therefore, the area of the closed cross section can be set larger. As a result, the stiffness and strength can be further increased. In the second referential embodiment, two thin plates 102a and 102b made of steel extend to the rear portions 24c of the left and right side members 22a and 22b, and the flange portions of the two thin plates 102a and 102b are superimposed on each other and integrally welded.

Figure 13:
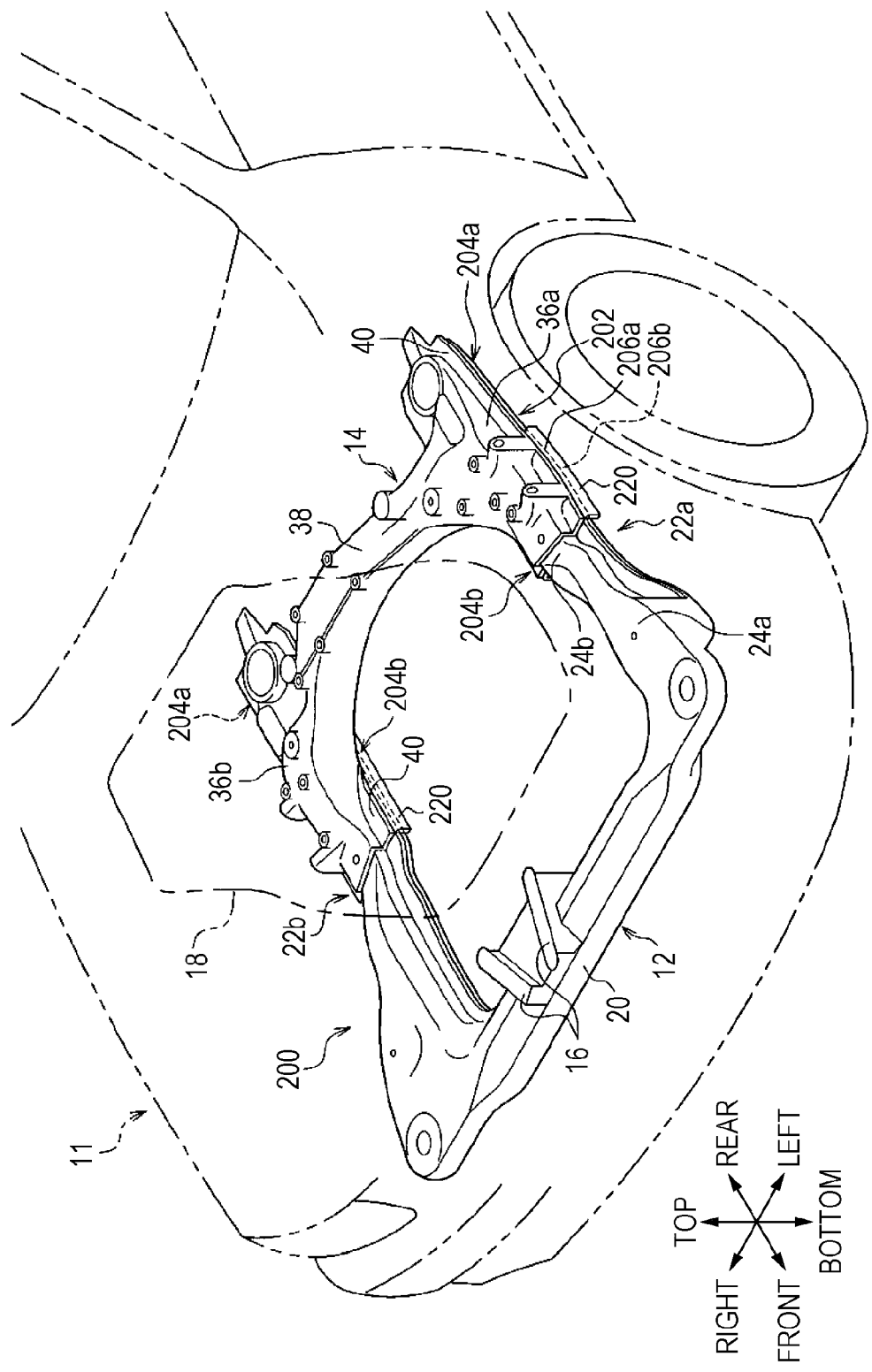
FIG. 13 is a schematic perspective view showing a state where a sub-frame structure according to an embodiment of the present disclosure is incorporated in the front portion of an automobile.
Figure 14:
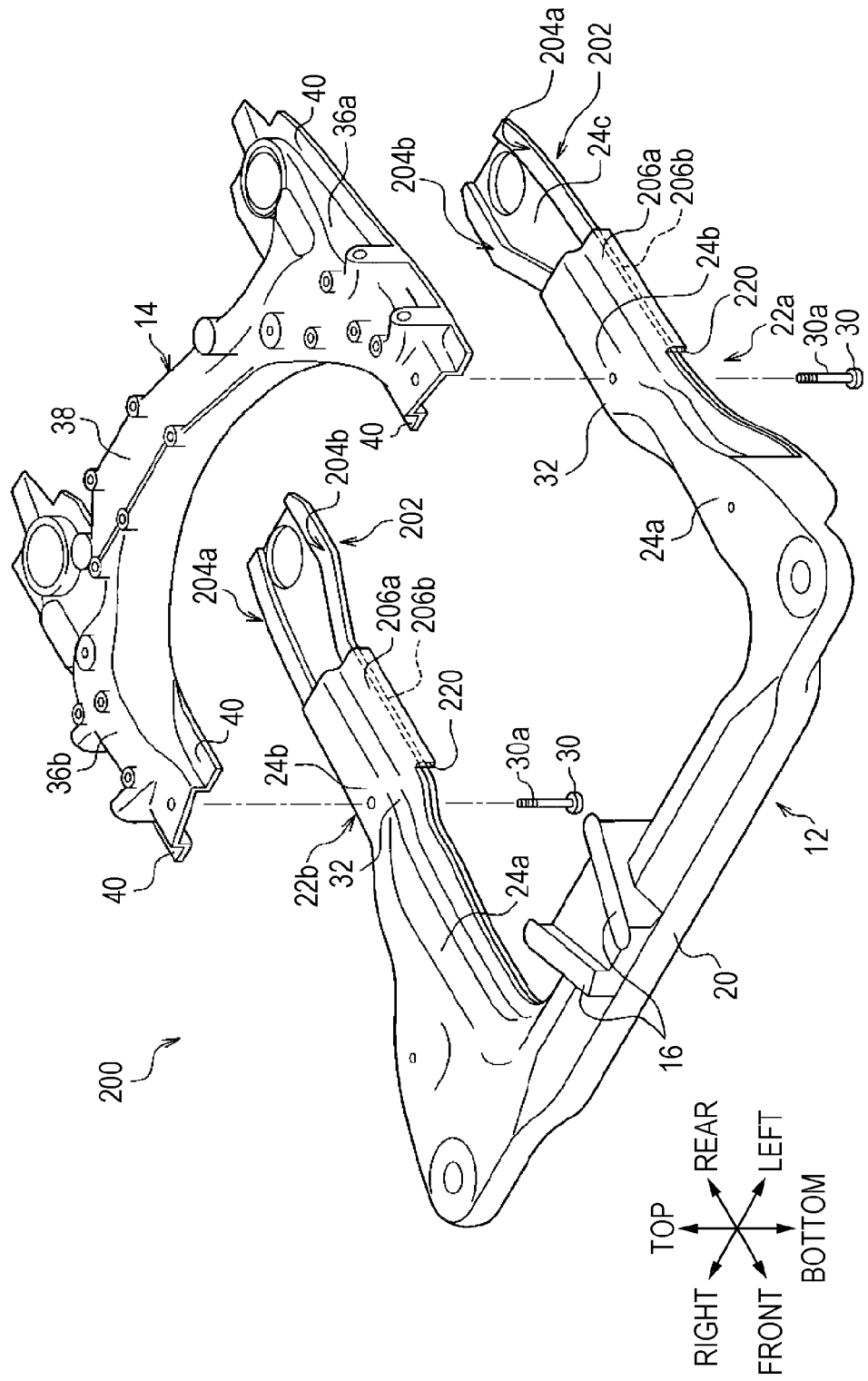
FIG. 14 is an exploded perspective view of the sub-frame structure according to this embodiment.
Figure 15A:
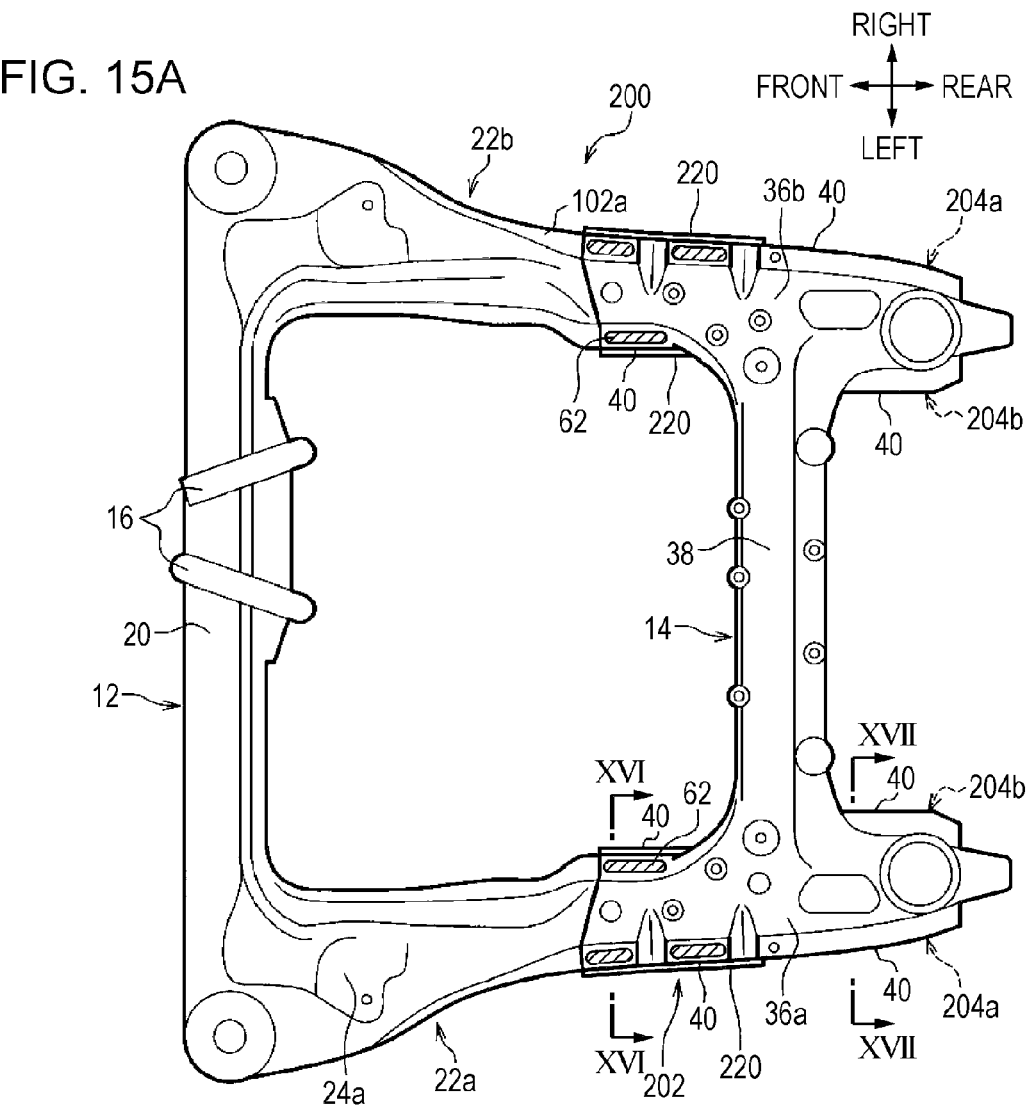
FIG. 15A is a plan view of the sub-frame structure according to this embodiment.
Figure 15B:
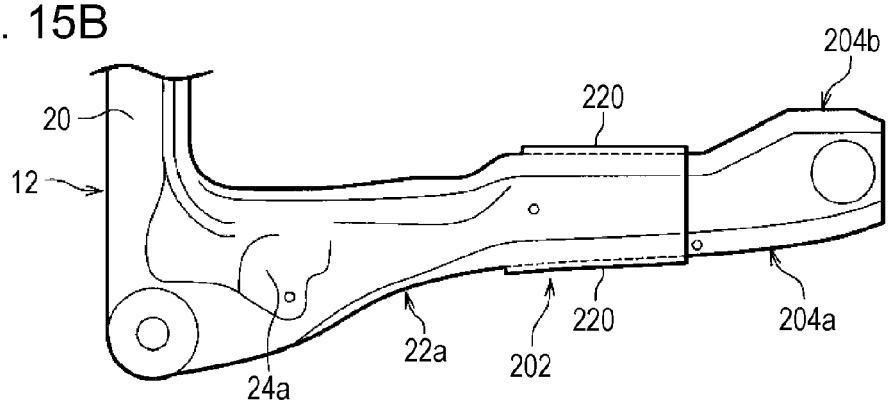
FIG. 15B is a partial plan view of the sub-frame structure with a rear sub-frame removed, that is, a front sub-frame.
Figure 16:
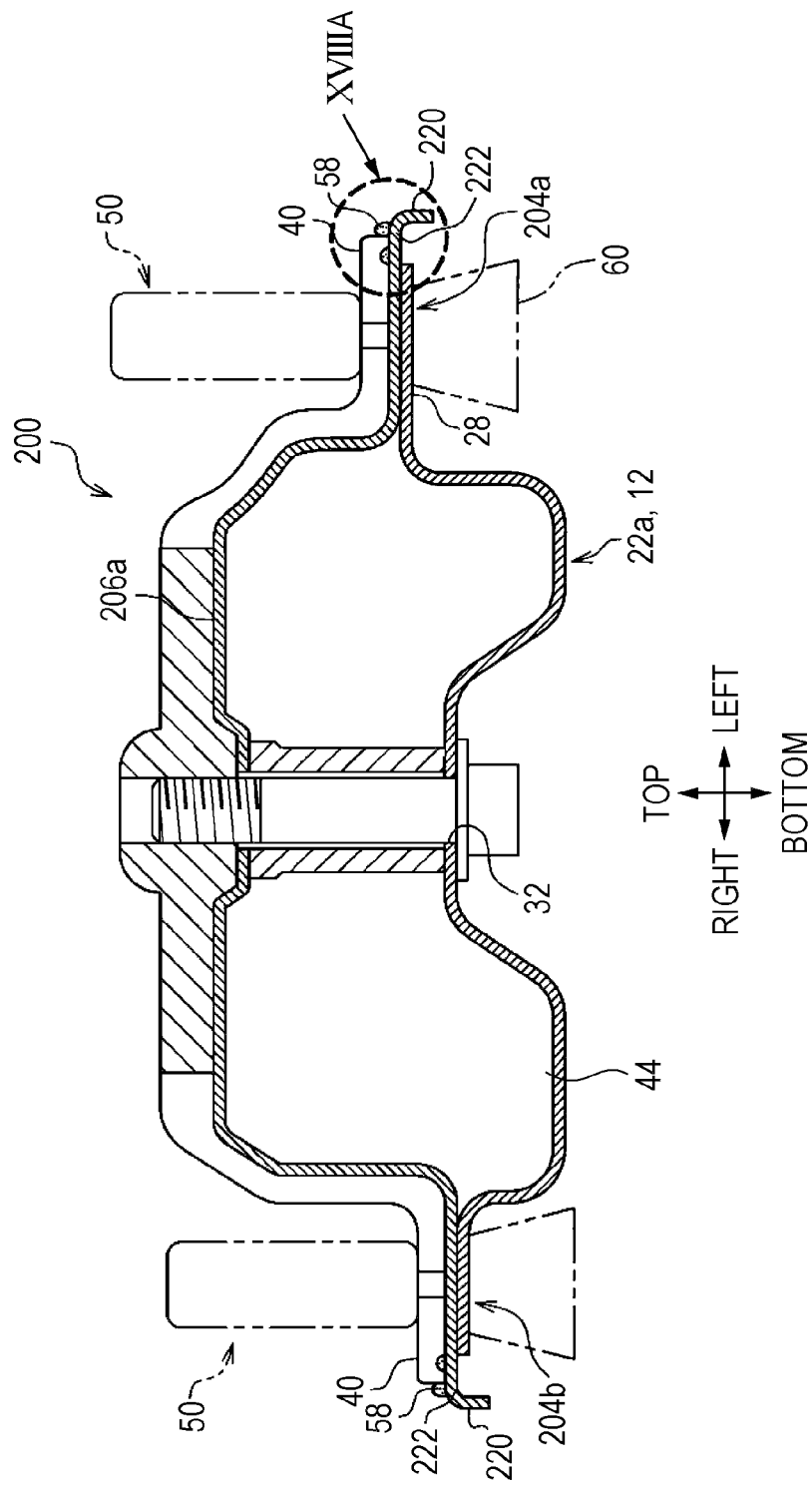
FIG. 16 is a vertical sectional view taken along line XVI-XVI of FIG. 15A.
Figure 17:
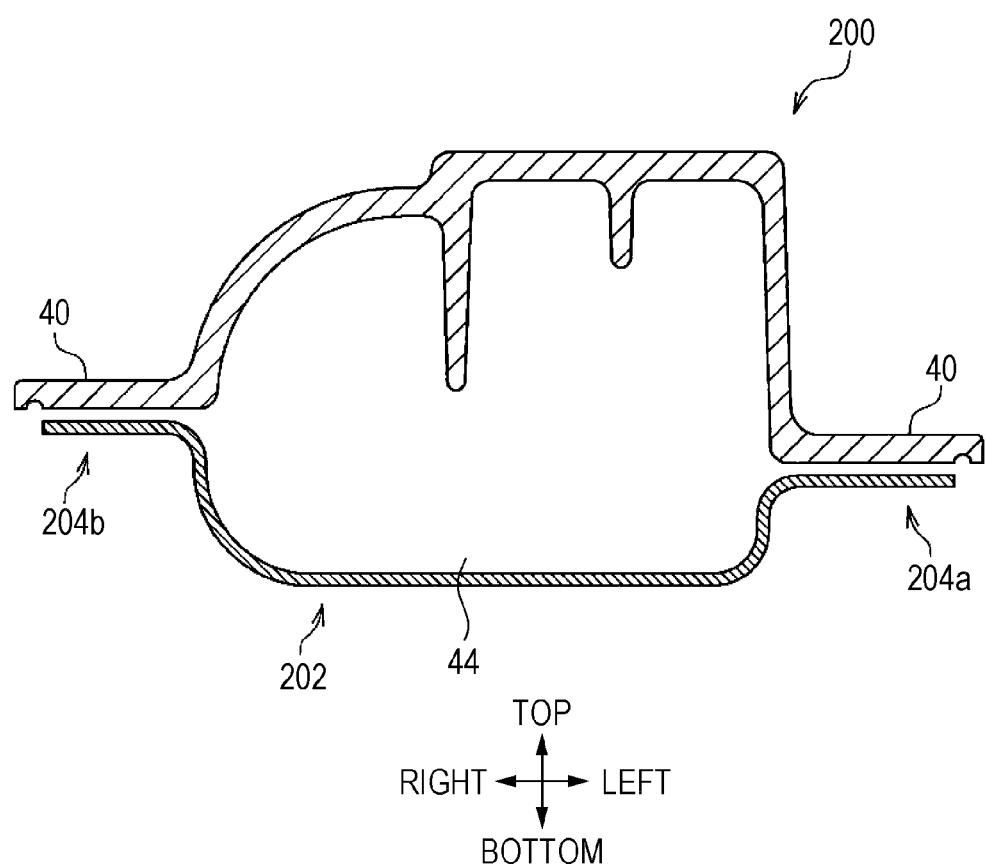
FIG. 17 is a vertical sectional view taken along line XVII-XVII of FIG. 15A.
Figure 19A:
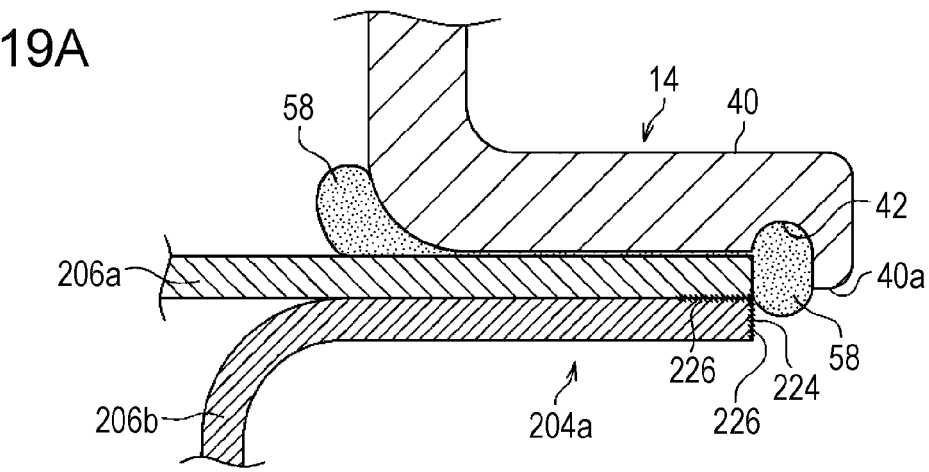
FIGS. 19A to 19C are partial enlarged vertical sectional views showing a state where a seal material peels in a comparative example.
Figure 19B:
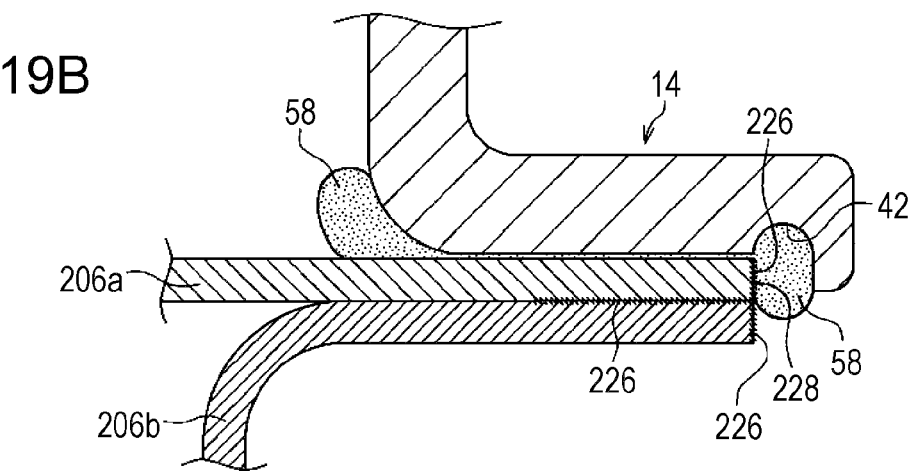
Figure 19C:
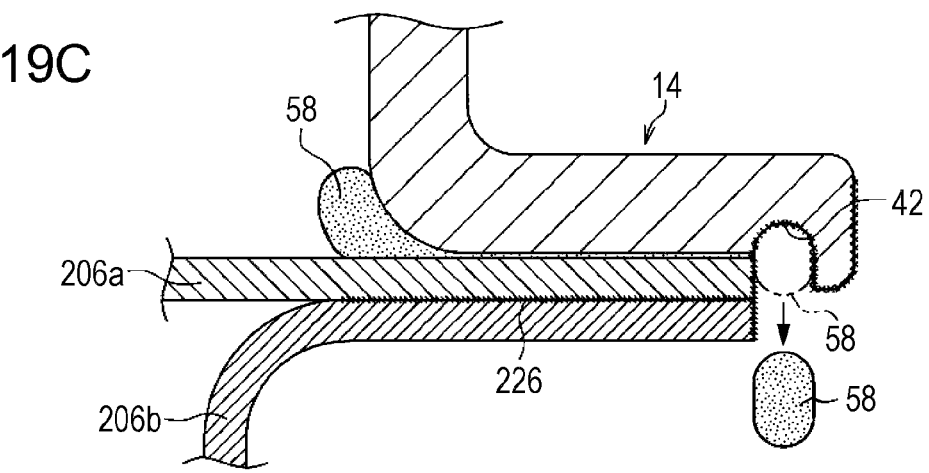
Figure 20A:
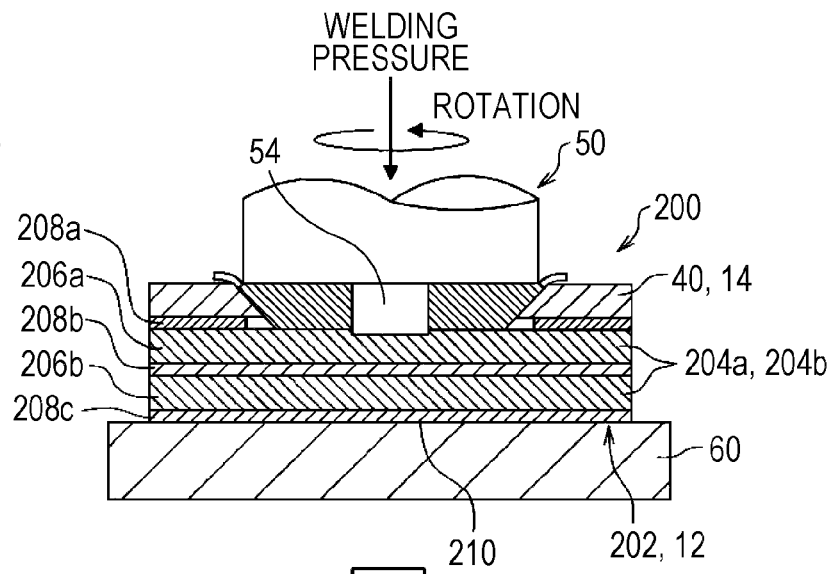
FIG. 20A is a vertical sectional view showing a state where flange portions of the front sub-frame and the rear sub-frame are friction stir welded in the sub-frame structure according to this embodiment.
Figure 20B:
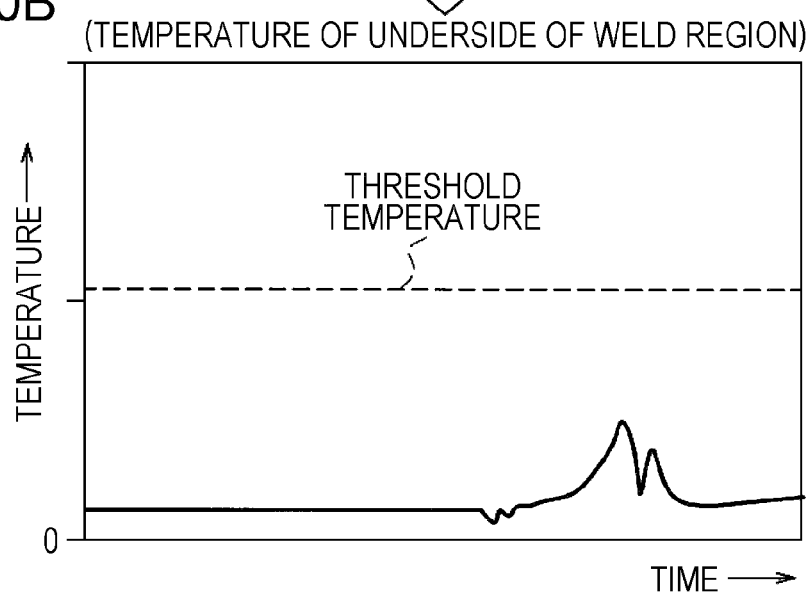
FIG. 20B is a characteristic diagram showing measurements of the temperature of the underside of the friction stir weld portion.
Figure 20C:
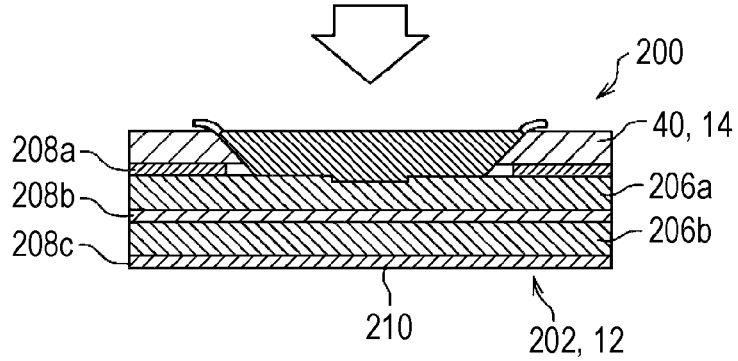
FIG. 20C is a vertical sectional view showing a state after friction stir welding.

Next, a sub-frame structure 200 according to an embodiment of the present disclosure will be described below. FIG. 13 is a schematic perspective view showing a state where a sub-frame structure according to an embodiment of the present disclosure is incorporated in the front portion of an automobile. FIG. 14 is an exploded perspective view of the sub-frame structure according to this embodiment. FIG. 15A is a plan view of the sub-frame structure according to this embodiment. FIG. 15B is a partial plan view of the sub-frame structure with a rear sub-frame removed, that is, a front sub-frame. FIG. 16 is a vertical sectional view taken along line XVI-XVI of FIG. 15A. FIG. 17 is a vertical sectional view taken along line XVII-XVII of FIG. 15A. FIG. 18A is a partial enlarged view of FIG. 16. FIG. 18B is a partial enlarged vertical sectional view showing a modification of a bent portion bent in a different direction. FIGS. 19A to 19C are partial enlarged vertical sectional views showing a state where a seal material peels in a comparative example. FIG. 20A is a vertical sectional view showing a state where flange portions of the front sub-frame and the rear sub-frame are friction stir welded in the sub-frame structure according to this embodiment. FIG. 20B is a characteristic diagram showing measurements of the temperature of the underside of the friction stir weld portion. FIG. 20C is a vertical sectional view showing a state after friction stir welding.

The sub-frame structure 200 according to this embodiment is the same as the sub-frame structures 10 and 100 of the first and second referential embodiments in that members made of different metals, that is, a front sub-frame (member made of iron) 12 and a rear sub-frame (member made of light metal such as aluminum or aluminum alloy, hereinafter referred to as aluminum member) 14 are integrally joined by friction stir welding.

On the other hand, the sub-frame structure 200 according to this embodiment differs from the sub-frame structures 10 and 100 of the first and second referential embodiments in that, as shown in FIG. 14, a central portion 24b and an extending portion 202 in the rear thereof (including flange portions 204a and 204b) of each of left and right side members 22a and 22b forming a front sub-frame 12 are formed so as to be thin by stacking two thin plates 206a and 206b made of steel, and the whole of each of the left and right side members 22a and 22b including the extending portion 202 is formed of a stack of two thin plates 206a and 206b. The stacked surfaces (flange portions) of two thin plates 206a and 206b are preliminarily integrally joined, for example, by MIG welding.

Of the two thin plates 206a and 206b made of steel, the upper thin plate 206a directly joined to the aluminum member 14 has bent portions 220 formed by bending at both ends thereof. As shown in FIG. 18A, the bent portions 220 are bent in substantially L-shape in cross section in the direction opposite to the aluminum member 14 (downward in the figure). The bent portions 220 are provided substantially symmetrically in both the left and right flange portions 204a and 204b. The bent portions 220 are provided so as to extend along the shape of the flange portions 204a and 204b of the extending portion 202 in the front-rear direction of the vehicle in plan view.

The bent portions 220 are preferably bent by not-shown press molding before friction stir welding. However, the bent portions 220 may be provided by bending the ends of the thin plate 206a after friction stir welding. As shown in the modification of FIG. 18B, bent portions 220 may be formed by bending the thin plate 206a toward the aluminum member 14 (upward in the figure) in substantially L-shape in cross section. In the bent portions 220 according to this modification, the seal material 58 protruding from a portion between the aluminum member 14 and the upper thin plate 206a to the outside is held between the end face 14a of the aluminum member 14 and the inner wall 220a of the bent portion 220.

At each end of the upper thin plate 206a directly joined to the aluminum member 14, an extending part 222 is provided. The extending part 222 extends outward farther than the end 14a of the aluminum member 14. The bent portion 220 is disposed at the farther end of the extending part 222. The extending part 222 is covered by the seal material 58 protruding from a portion between the aluminum member 14 and the upper thin plate 206a. The seal material 58 protruded outside is placed on the upper surface of the extending part 222, and the seal material 58 is thereby prevented from peeling and held in a stable state. The seal material 58 held on the upper surface of the extending portion 222 can adequately prevent a corrosion factor from entering through the gap between the aluminum member 14 and the upper thin plate 206a.

Here, before the friction stir welding of the front sub-frame (member made of iron) 12 and the rear sub-frame (member made of light metal such as aluminum or aluminum alloy, hereinafter referred to as aluminum member) 14, electrodeposition coatings 208a to 208c are preliminarily formed by electrodeposition coating process on both the upper and lower surfaces and the joined surfaces (stacked surfaces) therebetween of the flange portions 204a and 204b of the left and right side members 22a and 22b (see FIG. 20A).

The electrodeposition coating 208a functions as an electrodeposition coating formed on the surface joined to the aluminum member. The electrodeposition coating 208b functions as an electrodeposition coating formed on the stacked surfaces of the thin plates. The electrodeposition coating 208c functions as an electrodeposition coating formed on the lower surface of the thin plate on the side opposite to the surface joined to the aluminum member.

As shown in FIG. 17, the flange portions 204a and 204b of the left and right side members 22a and 22b formed by stacking two thin plates 206a and 206b, and the flange portions 40 of the left and right rear side portions 36a and 36b of the rear sub-frame 14 are superimposed on each other, and friction stir welded using the welding tool 50 while applying the seal material 58 to the superimposed surfaces. At that time, the probe (rotating tool for friction stir welding) 54 of the welding tool 50 enters (is inserted into) the left and right rear side portions 36a and 36b while rotating from a direction perpendicular to the superimposed surfaces, and comes into contact with the flange portions 204a and 204b of the left and right side members 22a and 22b, and frictional heat is generated in the left and right rear side portions 36a and 36b.

Next, a state where the seal material 58 peels will be described on the basis of the comparative example shown in FIGS. 19A to 19C. In the comparative example, bent portions 220 are not provided, a flange portion 204a where two thin plates 206a and 206b are stacked and a flange portion of an aluminum member 14 are superimposed on each other, and are friction stir welded using a welding tool 50 while applying a seal material 58 to the superimposed surfaces. In the comparative example, as with the first referential embodiment and the second referential embodiment, a recessed portion 42 that is arc-like in cross-section of the side edge portion 40a of the aluminum member 14 is filled with the seal material 58.

As shown in FIG. 19A, a corrosion factor, such as water, causes rust 226 on the edge portion 224 of the flange portion 204a of the lower thin plate 206 in FIG. 19A, and on the joined surfaces of the upper and lower thin plates 206a and 206b in a region near the edge portion 224. The reason is that when the thin plates 206a and 206b are galvanized, a plated layer is difficult to form on the edge portion 224 of the flange portion 204a.

Next, as shown in FIG. 19B, the rust 226 formed on the edge portion 224 of the lower thin plate 206b gradually spreads to the edge portion 228 of the upper thin plate 206a. When the spreading rust 226 reaches the aluminum member 14, electrical continuity is established. Therefore, as shown in FIG. 19C, a potential difference occurs and a corrosion current flows owing to the difference in ionization tendency between different metals (iron and aluminum), and galvanic corrosion (electrolytic corrosion) is thereby caused. Owing to this galvanic corrosion, the seal material 58 filling the recessed portion 42 of the aluminum member 14 peels off.

In this embodiment, the two thin plates 206a and 206b are formed, for example, by punching a galvanized thin plate. Therefore, in this embodiment, as shown in FIGS. 18A and 18B, if rust 226 is formed on the edge portion 230 of the flange portion 204 of the lower thin plate 206b and the edge portion 232 of the bent portion 220 of the upper thin plate 206a, the rust 226 on the edge portions 230 and 232 can be adequately prevented from deteriorating the seal performance of the seal material 58.

That is, in this embodiment, when two thin plates 206a and 206b made of steel are stacked, rust 226 can be prevented from having a bad influence on the seal material 58 by providing a bent portion 220 at the end of the upper thin plate 206a directly joined to the aluminum member 14 and intentionally causing rust 226 to originate on the edge portion 232 of the bent portion 220 without an electrodeposition coating. In addition, since the edge portion 232 of the bent portion 220 without an electrodeposition coating is spaced apart at a predetermined distance from the aluminum member 14, galvanic corrosion can be prevented from occurring.

In this embodiment, by holding the seal material 58 between the extending part 222 near the bent portion 220 and the edge portion 14a of the aluminum member 14, a corrosion factor can be adequately prevented from entering through the gap between the aluminum member 14 and the upper thin plate 206a.

In this embodiment, since two thin plates 206a and 206b made of steel are stacked, the underside 210 of the friction stir weld region does not reach a predetermined temperature (threshold temperature) at which the electrodeposition coating 208c can be decomposed (see FIG. 20B), and the electrodeposition coating 208c can be prevented from peeling (see FIG. 20C).

That is, when friction stir welding is performed, frictional heat is generated by the probe 54 entering, while rotating, the rear sub-frame 14 made of light metal such as aluminum alloy (member made of light metal) and moving toward the front sub-frame 12 made of steel (member made of iron), and this frictional heat may peel the electrodeposition coating 208c formed on the lower surface of the lower one 206b of the two stacked thin plates 206a and 206b.

In this embodiment, a central portion 24b and an extending portion 202 in the rear thereof of each of left and right side members 22a and 22b forming a front sub-frame 12 are formed so as to be thin by stacking two thin plates 206a and 206b made of steel, the frictional heat is prevented from reaching the electrodeposition coating 208c formed on the lower surface of the lower thin plate 206b, the temperature of the underside 210 of the electrodeposition coating region formed on the lower surface of the lower thin plate 206b is suppressed, and the electrodeposition coating 208c formed on the underside 210 of the friction stir weld region is thereby protected.

FIG. 20B is a characteristic diagram showing the temperature of the underside 210 of the friction stir weld portion (the lower surface of the lower one 206b of the two stacked steel thin plates 206a and 206b) measured using a not-shown temperature sensor. In this case, although the temperature of the lower surface of the lower thin plate 206b rises slightly owing to the friction stir welding, the temperature does not reach a predetermined temperature (threshold temperature) at which the electrodeposition coating 208c formed on the lower surface of the lower thin plate 206b is decomposed, and therefore the electrodeposition coating 208c can be prevented from peeling, and the electrodeposition coating 208c can be stably protected.

The electrodeposition coating 208a formed between the upper one 206a of the two stacked thin plates 206a and 206b made of steel and the rear sub-frame 14 made of light metal such as aluminum alloy can be reliably ejected from the joint surface between the front sub-frame 12 and the rear sub-frame 14 by friction stir welding.

In this embodiment, the central portion 24b and the extending portion 202 in the rear thereof (including the flange portions 204a and 204b) of each of the left and right side members 22a and 22b forming the front sub-frame 12 are formed by stacking two thin plates 206a and 206b made of steel. However, the present disclosure is not limited to this. The number of stacked thin plates may be two or more.

In this embodiment, as shown in FIG. 17, the flange portions 204a and 204b of the front sub-frame 12 made of steel and formed by stacking two thin plates 206a and 206b, and the flange portions 40 of the rear sub-frame 14 made of light metal such as aluminum alloy are friction stir welded to each other, and a closed cross section 44 is formed between the flange portions 204a and 204b of the front sub-frame 12 made of steel and the flange portions 40 of the rear sub-frame 14 made of light metal welded to each other. As a result, the left and right side members 22a and 22b of the sub-frame structure 200 in which closed cross sections 44 are formed are obtained. In this embodiment, by forming closed cross sections 44 in the left and right side members 22a and 22b, the stiffness and strength of the left and right side members 22a and 22b can be further increased. The present disclosure is not limited to the above-described embodiment, and variations and modifications may be made without departing from the scope of the present disclosure.

We claim:

1. A different material welded structure comprising:
a thin plate-shaped iron member; and
a thin plate-shaped light metal member, the iron member and the light metal member being integrally welded with each other,
wherein the iron member comprises a stack of two or more thin steel plates,
wherein the thin steel plates are electrodeposition-coated before welding to the light metal member such that an electrodeposition coating is formed on a first surface of the stack welded to the light metal member, on an opposite surface of the stack located opposite to the first surface, and on respective intermediate surfaces of the thin steel plates located between the first surface and the opposite surface,
wherein the iron member and the light metal member are friction stir welded by
superimposing the iron member and the light metal member on each other,
applying a seal material to respective superimposed surfaces of the iron member and the light metal member, the superimposed surfaces facing to each other,
inserting a rotating tool for friction stir welding while rotating into the light metal member toward the iron member by moving the rotating tool in a direction perpendicular to the superimposed surfaces, and
further inserting the rotating tool for friction stir welding while rotating into the iron member, and
wherein, of the two or more thin steel plates, the thin steel plate welded to the light metal member has a bent portion formed by bending at an end thereof,
wherein the iron member and the light metal member constitute a sub-frame structure of a vehicle, and the thin steel plate welded to the light metal member extends beyond the light metal member at the outside end of the sub-frame structure.

2. The different material welded structure according to claim 1,
wherein the bent portion is disposed at the outside end of the sub-frame structure.

3. The different material welded structure according to claim 1,
wherein the bent portion is bent in a direction opposite to the light metal member.

4. The different material welded structure according to claim 1,
wherein the seal material disposed between the iron member and the light metal member is bulged out from an end of the light metal member along a surface of the thin steel plate extending beyond the light metal member and along an end surface of the light metal member.

5. The different material welded structure according to claim 1, wherein the sub-frame structure includes a flange portion, and
the flange portion includes the welded portion of the iron member and the light metal member.

* * * * *